US012546802B2

(12) United States Patent
Pease et al.

(10) Patent No.: US 12,546,802 B2
(45) Date of Patent: Feb. 10, 2026

(54) VOLTAGE AND CURRENT PROBE ASSEMBLIES FOR RADIO FREQUENCY CURRENT CARRYING CONDUCTORS

(71) Applicant: LAM RESEARCH CORPORATION, Fremont, CA (US)

(72) Inventors: John Pease, San Mateo, CA (US); Thomas W. Anderson, Hayward, CA (US); Michael Drymon, Diablo Grande, CA (US)

(73) Assignee: Lam Research Corporation, Fremont, CA (US)

( * ) Notice: Subject to any disclaimer, the term of this patent is extended or adjusted under 35 U.S.C. 154(b) by 143 days.

(21) Appl. No.: 18/695,091

(22) PCT Filed: Sep. 26, 2022

(86) PCT No.: PCT/US2022/044713
§ 371 (c)(1),
(2) Date: Mar. 25, 2024

(87) PCT Pub. No.: WO2023/055688
PCT Pub. Date: Apr. 6, 2023

(65) Prior Publication Data
US 2025/0164526 A1    May 22, 2025

Related U.S. Application Data

(60) Provisional application No. 63/250,110, filed on Sep. 29, 2021.

(51) Int. Cl.
*G01R 1/067* (2006.01)
*G01D 5/20* (2006.01)
(Continued)

(52) U.S. Cl.
CPC ..... *G01R 1/06772* (2013.01); *G01R 1/06777* (2013.01); *G01R 31/2886* (2013.01)

(58) Field of Classification Search
CPC . G01R 1/02; G01R 1/04; G01R 1/067; G01R 1/073; G01R 19/00; G01R 31/26;
(Continued)

(56) References Cited

U.S. PATENT DOCUMENTS

2002/0039030 A1    4/2002    Khazei
2009/0066342 A1    3/2009    Lemson
(Continued)

FOREIGN PATENT DOCUMENTS

CN    206945761 U    1/2018

OTHER PUBLICATIONS

International Search Report and Written Opinion of the ISA issued in PCT/US2022/044713, mailed Jan. 20, 2023; ISA/KR.

*Primary Examiner* — Neel D Shah

(57) ABSTRACT

A probe assembly includes a stepped insulator and a printed circuit board. The insulator is configured to surround a current carrying conductor. The printed circuit board includes a main portion and an outward protruding portion. The outward protruding portion is implemented as a voltage probe and extends outward away from the main portion and into the insulator. The printed circuit board includes a conductive element, one or more dielectric layers, and a pickup element, where the conductive element extends through the one or more dielectric layers and is connected to the pickup element, and where the pickup element is embedded in the one or more dielectric layers and disposed proximate the current carrying conductor. The printed circuit board includes signal conditioning components connected to the conductive element of the voltage probe.

34 Claims, 15 Drawing Sheets

(51) Int. Cl.
*G01R 1/04* (2006.01)
*G01R 1/073* (2006.01)
*G01R 19/00* (2006.01)
*G01R 31/26* (2020.01)
*G01R 31/28* (2006.01)
*G01R 33/07* (2006.01)
*G01R 33/09* (2006.01)

(58) Field of Classification Search
CPC ...... G01R 31/28; G01R 31/302; G01R 33/07; G01R 33/09; G01D 5/20
See application file for complete search history.

(56) References Cited

U.S. PATENT DOCUMENTS

2014/0049250 A1* 2/2014 Brown ................ H01F 27/2804
324/127
2020/0249286 A1 8/2020 David et al.

* cited by examiner

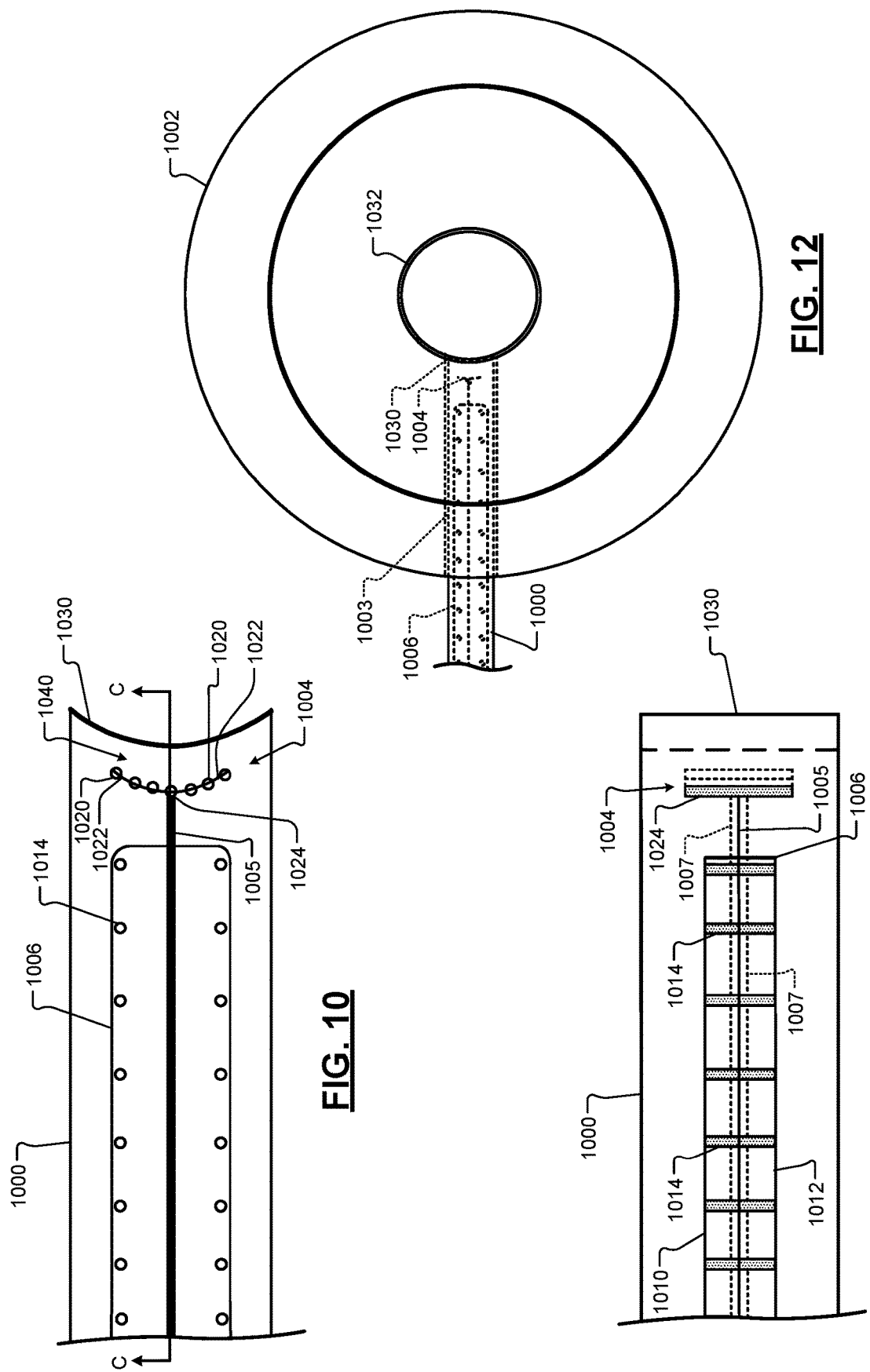

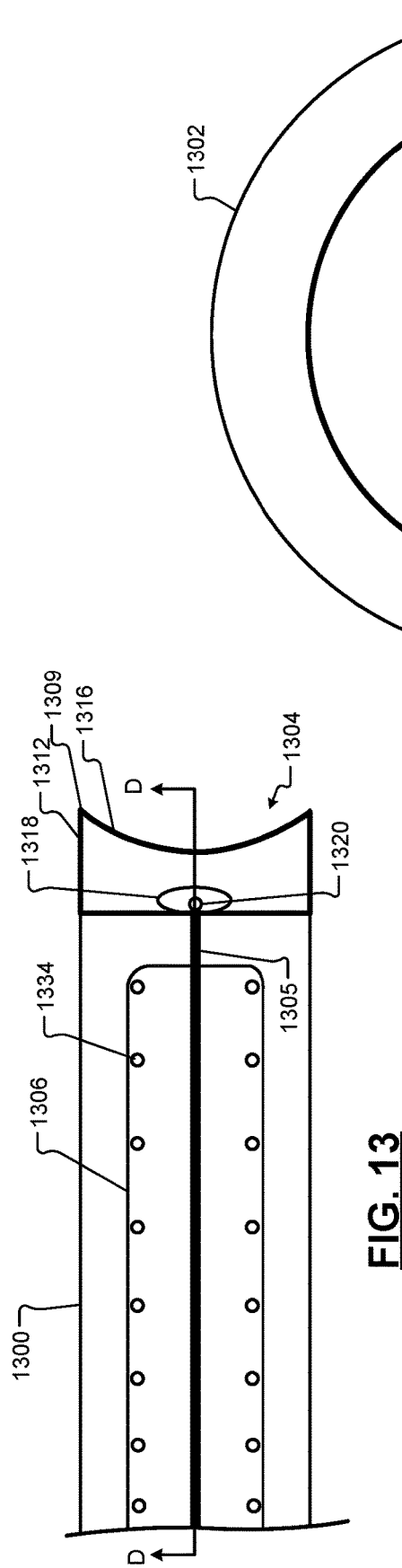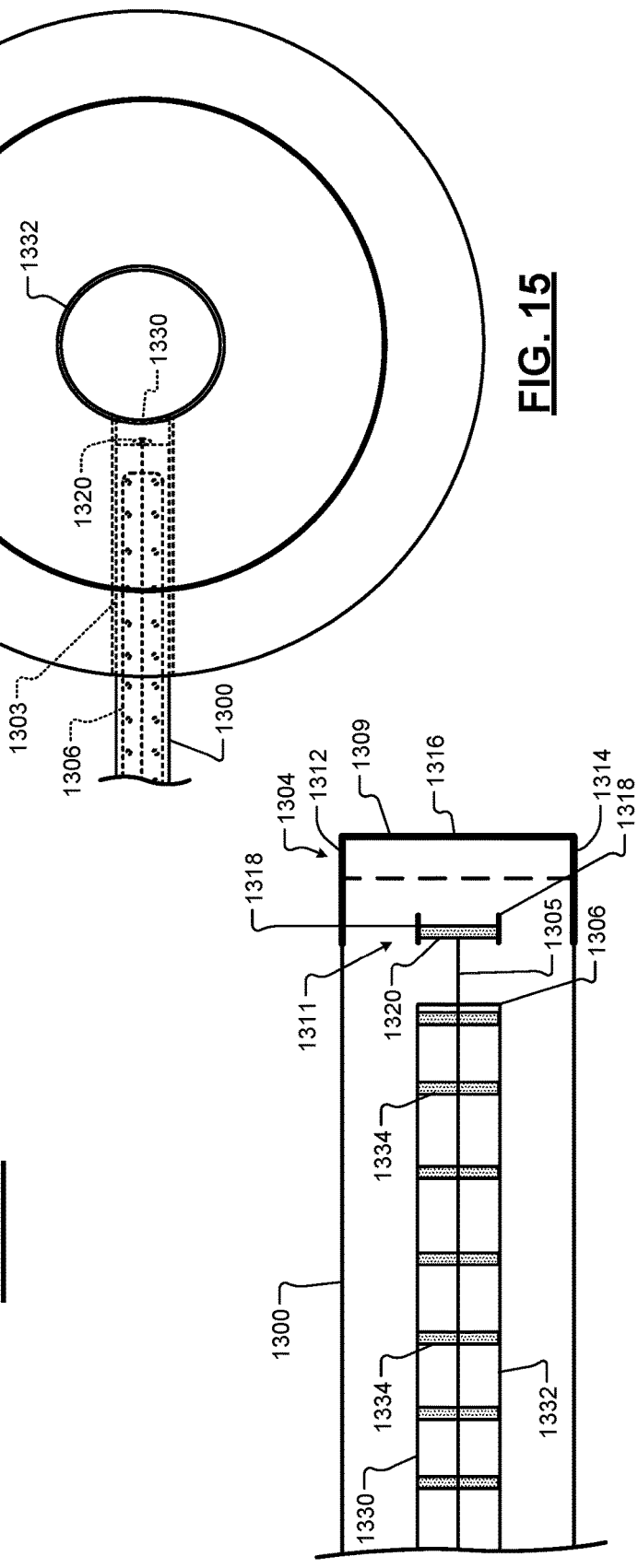

VOLTAGE AND CURRENT PROBE ASSEMBLIES FOR RADIO FREQUENCY CURRENT CARRYING CONDUCTORS

CROSS-REFERENCE TO RELATED APPLICATIONS

This application is a U.S. National Phase Application under 35 U.S.C. 371 of International Application No. PCT/US2022/044713, filed on Sep. 26, 2022, which claims the benefit of U.S. Provisional Application No. 63/250,110, filed on Sep. 29, 2021. The entire disclosure disclosures of the above applications are incorporated herein by reference.

FIELD

The present disclosure relates to substrate processing systems and more particularly to voltage and current probes for substrate processing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems are used to treat substrates, such as semiconductor wafers. Example processes that may be performed on a substrate include, but are not limited to, deposition, etching, and cleaning.

A substrate may be arranged on a substrate support, such as a pedestal or an electrostatic chuck (ESC), in a processing chamber. During processing, gas mixtures may be introduced into the processing chamber and plasma may be used to initiate chemical reactions.

A controller of a substrate processing system may be configured to control gas flow to and from the processing chamber. The controller may also be configured to control power applied to one or more electrodes and/or to other radio frequency (RF) current carrying conductors located in the substrate processing system. The controller may control power applied to the RF current carrying conductors based on one or more voltage and/or current measurements.

SUMMARY

A probe assembly is provided and includes an insulator and a first printed circuit board. The insulator is configured to surround a current carrying conductor. The first printed circuit board includes a main portion and an outward protruding portion. The outward protruding portion is implemented as a voltage probe and extends outward away from the main portion and into the insulator. The first printed circuit board further includes a conductive element, one or more dielectric layers, and a pickup element, where the conductive element extends through the one or more dielectric layers and is connected to the pickup element. The pickup element is embedded in the one or more dielectric layers and disposed proximate the current carrying conductor. The first printed circuit board further includes signal conditioning components connected to the conductive element.

In other features, the insulator is a stepped insulator. In other features, the first printed circuit board is connected to the insulator via at least one of a plate and a bracket.

In other features, the outward protruding portion is not in contact with the current carrying conductor and is separated from the current carrying conductor by dielectric material of the insulator.

In other features, the outward protruding portion extends into the insulator and contacts the current carrying conductor. In other features, an end of the outward protruding portion that contacts the current carrying conductor is formed of dielectric material. In other features, the outward protruding portion includes a conductive end cap that contacts the current carrying conductor.

In other features, the outward protruding portion includes an embedded shield. In other features, the embedded shield includes a first conductive layer and a second conductive layer connected to the first conductive layer by conductive vias.

In other features, the conductive element is connected to the pickup element by a via. In other features, the outward protruding portion has an end that is shaped to match a shape of the current carrying conductor. In other features, the pickup element is shaped to match a shape of the current carrying conductor.

In other features, the pickup element includes vias connected by conductive elements. In other features, the pickup element includes an end portion and an inner portion separated by dielectric material of the first printed circuit board. The end portion includes a first conductive element. The inner portion includes a via and conductive elements. The end portion is configured to contact the current carrying conductor. The inner portion, the end portion and the dielectric material between the inner portion and the end portion provide a primary divider capacitor. In other features, the end portion is shaped to match a shape of the current carrying conductor.

In other features, the probe assembly further includes a compliant radio frequency conductive element disposed between and in contact with the outward protruding portion and the current carrying conductor.

In other features, the compliant radio frequency conductive element is implemented as a spring.

In other features, the current carrying conductor includes a circular-shaped slot that extends circumferentially around the current carrying conductor. The compliant radio frequency conductive element is implemented as a spring and is disposed in the circular-shaped slot.

In other features, the probe assembly further includes a current probe including coils. The coils are: mounted on a first side of the first printed circuit board separate from the insulator, configured to detect a magnetic field generated by the current carrying conductor, and differentially transformer coupled to reject common mode voltage. The voltage probe is disposed on a second side of the first printed circuit board opposite the first side.

In other features, the first printed circuit board includes first shields disposed between the current carrying conductor and the coils.

In other features, the first shields include: a first shield connected to a radio frequency return reference terminal; and a second shield connected to a ground reference terminal.

In other features, the first shields include: a first shield embedded in the first printed circuit board; and a second shield disposed on the first printed circuit board.

In other features, the probe assembly further includes: first shields at least one of disposed on and embedded in the first printed circuit board; a second printed circuit board connected to the first printed circuit board and extending perpendicular to the first printed circuit board; and second shields at least one of disposed on and embedded in the second printed circuit board.

In other features, a substrate processing system is provided and includes the probe assembly, the current carrying conductor, and a controller. The current carrying conductor extends through a hole in the insulator. The controller is configured to: receive an output of the signal conditioning components, where the output is indicative of a voltage on the current carrying conductor; and adjust an operation of the substrate processing system based on the voltage.

In other features, a voltage and current probe assembly is provided and includes an insulator, a voltage probe, a current probe, and at least one printed circuit board. The insulator is configured to surround a current carrying conductor. The voltage probe is configured to be disposed at least partially within the insulator, where: the voltage probe includes a conductive element, an outer dielectric member, and a pickup element; the conductive element extends through the outer dielectric member and connects to the pickup element; and the pickup element is disposed proximate the current carrying conductor and is separated from the current carrying conductor by dielectric material of the insulator. The current probe includes coils disposed separate from the insulator and configured to detect a magnetic field generated by the current carrying conductor. The at least one printed circuit board is adjacent to the insulator. The at least one printed circuit board includes signal conditioning components connected to the conductive element of the voltage probe and the coils. The coils are mounted on a first side of the at least one printed circuit board. The voltage probe is disposed on a second side of the at least one printed circuit board opposite the first side.

In other features, the insulator is a stepped insulator. In other features, the at least one printed circuit board includes first shields disposed between the current carrying conductor and the coils. In other features, the first shields include: a first shield connected to a radio frequency return reference terminal; and a second shield connected to a ground reference terminal.

In other features, the first shields include: a first shield embedded in the at least one printed circuit board; and a second shield disposed on the at least one printed circuit board.

In other features, the voltage and current probe assembly further includes: first shields at least one of disposed on and embedded in a first printed circuit board, where the at least one printed circuit board includes the first printed circuit board and a second printed circuit board, and where the second printed circuit board is connected to the first printed circuit board and extends perpendicular to the first printed circuit board; and second shields at least one of disposed on and embedded in the second printed circuit board.

In other features, the insulator includes: a mounting block including holes for attaching the insulator to at least one of a plate and a bracket, where the at least one of the plate and the bracket is connected to the at least one printed circuit board; and annular members connected to the mounting block.

In other features, the mounting block and the annular members are integrally formed as a single component. The mounting block and the annular members are formed of dielectric material. The current carrying conductor extends through the mounting block and the annular members.

In other features, a substrate processing system is provided and includes: the voltage and current probe assembly; the current carrying conductor extending through a hole in the insulator; and a controller. The controller is configured to: receive outputs of the signal conditioning components, where the outputs are indicative of a voltage on and a current level of the current carrying conductor; and adjust an operation of the substrate processing system based on the voltage and the current level.

In other features, the substrate processing system further includes a radio frequency gasket, a mounting plate, and a chassis. The at least one printed circuit board is connected to the mounting plate. The radio frequency gasket is disposed between the mounting plate and the chassis.

In other features, a probe assembly is provided and includes a stepped insulator and a first printed circuit board. The stepped insulator is configured to surround a current carrying conductor. The first printed circuit board is connected to the stepped insulator via at least one of a plate and a bracket and includes a main portion and an outward protruding portion. The outward protruding portion is implemented as a voltage probe and extends outward away from the main portion and into the stepped insulator. The first printed circuit board includes a conductive element, one or more dielectric layers, and a pickup element, where the conductive element extends through the one or more dielectric layers and is connected to the pickup element, and where the pickup element is embedded in the one or more dielectric layers and disposed proximate the current carrying conductor. The first printed circuit board includes signal conditioning components connected to the conductive element of the voltage probe.

In other features, the outward protruding portion is not in contact with the current carrying conductor and is separated from the current carrying conductor by dielectric material of the stepped insulator. In other features, the outward protruding portion extends into the stepped insulator and contacts the current carrying conductor. In other features, an end of the outward protruding portion that contacts the current carrying conductor is formed of dielectric material. In other features, the outward protruding portion includes a conductive end cap that contacts the current carrying conductor.

In other features, the outward protruding portion includes an embedded shield. In other features, the embedded shield includes a first conductive layer and a second conductive layer connected to the first conductive layer by conductive vias.

In other features, the conductive element is connected to the pickup element by a via. In other features, the outward protruding portion has an end that is shaped to match a shape of the current carrying conductor. In other features, the pickup element is shaped to match a shape of the current carrying conductor. In other features, the pickup element includes vias connected by conductive elements.

In other features, the probe assembly includes: the pickup element includes an end portion and an inner portion separated by dielectric material of the first printed circuit board; the end portion includes a first conductive element; and the inner portion includes a via and conductive elements; the end portion is configured to contact the current carrying conductor; and the inner portion, the end portion and the dielectric material between the inner portion and the end portion provide a primary divider capacitor.

In other features, the end portion is shaped to match a shape of the current carrying conductor. In other features, the probe assembly further includes a compliant radio frequency conductive element disposed between and in contact with the outward protruding portion and the current carrying conductor. In other features, the compliant radio frequency conductive element is implemented as a spring.

In other features, the current carrying conductor includes a circular-shaped slot that extends circumferentially around the current carrying conductor. The compliant radio frequency conductive element is implemented as a spring and is disposed in the circular-shaped slot.

In other features, the probe assembly further includes a current probe including coils. The coils are: mounted on a first side of the first printed circuit board separate from the stepped insulator; and configured to detect a magnetic field generated by the current carrying conductor; transformer coupled to reject common mode voltage; and the voltage probe is disposed on a second side of the first printed circuit board opposite the first side.

In other features, the first printed circuit board includes first shields disposed between the current carrying conductor and the coils. The first shields include a first shield connected to a radio frequency return reference terminal and a second shield connected to a ground reference terminal.

In other features, the first shields include a first shield embedded in the first printed circuit board and a second shield disposed on the first printed circuit board.

In other features, the probe assembly further includes: first shields at least one of disposed on and embedded in the first printed circuit board; a second printed circuit board connected to the first printed circuit board and extending perpendicular to the first printed circuit board; and second shields at least one of disposed on and embedded in the second printed circuit board.

In other features, a substrate processing system includes: the probe assembly; the current carrying conductor extending through a hole in the stepped insulator; and a controller. The controller is configured to: receive an output of the signal conditioning components, where the output is indicative of a voltage on the current carrying conductor; and adjust an operation of the substrate processing system based on the voltage.

In other features, a voltage and current probe assembly including a stepped insulator, a voltage probe, a current probe, and at least one printed circuit board. The stepped insulator is configured to surround a current carrying conductor. The voltage probe is configured to be disposed at least partially within the stepped insulator, where: the voltage probe includes a conductive element, an outer dielectric member, and a pickup element; the conductive element extends through the outer dielectric member and connects to the pickup element; and the pickup element is disposed proximate the current carrying conductor and is separated from the current carrying conductor by dielectric material of the stepped insulator. The current probe includes coils disposed separate from the stepped insulator and configured to detect a magnetic field generated by the current carrying conductor. The at least one printed circuit board is adjacent to the stepped insulator. The at least one printed circuit board includes signal conditioning components connected to the conductive element of the voltage probe and the coils. The coils are mounted on a first side of the at least one printed circuit board. The voltage probe is disposed on a second side of the at least one printed circuit board opposite the first side.

In other features, the at least one printed circuit board includes first shields disposed between the current carrying conductor and the coils. In other features, the first shields include: a first shield connected to a radio frequency return reference terminal; and a second shield connected to a ground reference terminal. In other features, the first shields include a first shield embedded in the at least one printed circuit board and a second shield disposed on the at least one printed circuit board.

In other features, the voltage and current probe assembly further includes: first shields at least one of disposed on and embedded in a first printed circuit board, where the at least one printed circuit board includes the first printed circuit board and a second printed circuit board, and where the second printed circuit board is connected to the first printed circuit board and extends perpendicular to the first printed circuit board; and second shields at least one of disposed on and embedded in the second printed circuit board.

In other features, the stepped insulator includes: a mounting block including holes for attaching the stepped insulator to the at least one of a plate and a bracket, where the at least one of the plate and the bracket is connected to the at least one printed circuit board; and annular members connected to the mounting block.

In other features, the mounting block and the annular members are integrally formed as a single component. The mounting block and the annular members are formed of dielectric material. The current carrying conductor extends through the mounting block and the annular members.

In other features, a substrate processing system includes the voltage and current probe assembly, the current carrying conductor, and a controller. The current carrying conductor extends through a hole in the stepped insulator. The controller is configured to: receive outputs of the signal conditioning components, where the outputs are indicative of a voltage on and a current level of the current carrying conductor; and adjust an operation of the substrate processing system based on the voltage and the current level.

In other features, the substrate processing system further includes a radio frequency gasket, a mounting plate, and a chassis, where: the at least one printed circuit board is connected to the mounting plate; and the radio frequency gasket is disposed between the mounting plate and the chassis.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10 is a front cross-sectional view of an example PCB voltage probe including an arched embedded pickup element and a shield in accordance with the present disclosure;

FIG. 11 is a side cross-sectional view of the PCB voltage probe of FIG. 10 taken at section line C-C of FIG. 10;

FIG. 12 is a front view illustrating application of the PCB voltage probe of FIG. 10;

FIG. 13 is a front cross-sectional view of another example PCB voltage probe including an arched capacitor style pickup element and a shield in accordance with the present disclosure;

FIG. 14 is a side cross-sectional view of the PCB voltage probe of FIG. 13 taken at section line D-D of FIG. 13;

FIG. 15 is a front view illustrating application of the PCB voltage probe of FIG. 13;

In the drawings, reference numbers may be reused to identify similar and/or identical elements.

DETAILED DESCRIPTION

Figure 1:
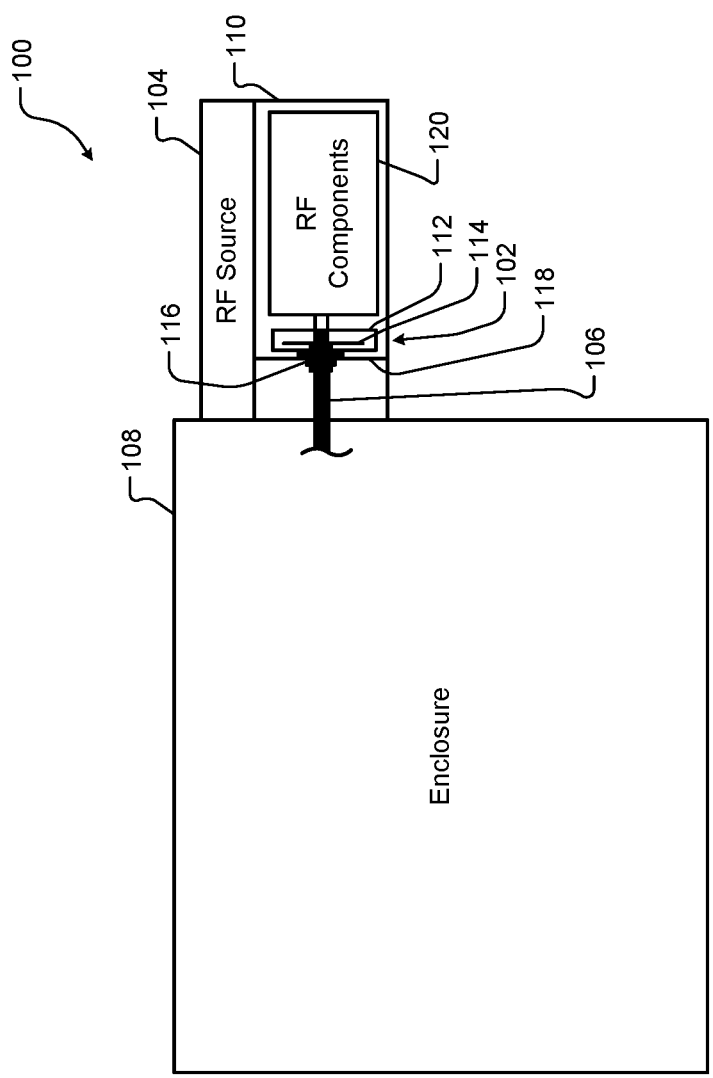
FIG. 1 is a functional block diagram of an example portion of a substrate processing system including a voltage and current probe assembly (referred to as VI probe assembly) in accordance with the present disclosure.

A VI probe assembly measures voltage on and a current level of a current carrying conductor, such as a RF feed rod. The VI probe assembly may include a ring surrounding the feed rod, which together perform as a primary voltage divider capacitor. A primary divider capacitor refers to a high voltage small valued capacitor of a voltage divider. The voltage divider includes a primary divider capacitor and a secondary divider capacitor connected in series. The secondary divider capacitor is a low voltage high value capacitor. The ring must be carefully aligned with the RF feed rod to avoid errors and is therefore sensitive to mechanical tolerances. A large gap must exist between the ring and the RF feed rod and/or insulating spacers must be included between the ring and the RF feed rod to satisfy high-voltage creep and clearance requirements. The large gap degrades isolation and crosstalk performance of the primary voltage divider capacitor and the overall ring assembly requires a metal shield to reject stray fields. The structure of the ring has limited ability to compensate for poor symmetrical alignment with the RF feed rod. The ring also offers no immunity to stray fields without an enclosing shield.

Voltage in a RF feed rod may alternatively be detected using a voltage sensor that routes detected RF through a PCB having an embedded trace. The trace is connected to a string of high voltage capacitors to form a divider. This type of voltage sensor is sensitive to stray fields, which may be mitigated by including additional shielding. This type of voltage sensor however does minimize and/or eliminate errors associated with mechanical tolerances. Large spacing and air gaps must be provided between the RF feed rod and the voltage sensor to satisfy high voltage creepage and clearance requirements.

A voltage sensor may further be provided by connecting a high-voltage primary divider capacitor via a high-voltage wire and clip to a high voltage RF source. The components of the high-voltage primary divider capacitor are mounted on a PCB that is potted to satisfy high-voltage creepage and clearance requirements. Inductance of the wire in this type of voltage sensor tends to reduce bandwidth and/or cause ringing with an associated poor pulse dynamic response.

A VI sensor may include a current sensor provided using a ring type coil that is implemented as a PCB. The PCB may include a trace as described above and may perform as a voltage sensor or alternatively a coiled wire may be disposed around the corresponding RF feed rod to detect voltage. These VI sensor configurations may be implemented as Rogowski coils to provide a limited degree of stray field rejection. The coils must have corresponding external shielding to reject stray fields, but not be too well shielded such that a magnetic field of the RF feed rod is rejected. The VI sensor is sensitive to stray capacitance. This sensitivity is increased due to the required external shielding.

Current sensing may also be implemented with discrete coils on opposite sides of a PCB surrounding an embedded trace as described above. Stray field rejection can occur with this type of current sensing if the coils are transformer coupled and if the stray field is the same on both sides of the PCB.

The examples set forth herein include VI probe assemblies, which directly probe voltages of current carrying conductors (e.g., RF feed rods, and/or other RF current carrying conductors) and indirectly probe current of magnetic fields generated by the current carrying conductors. The VI probe assemblies include voltage probes (or voltage sensors) and current probes (or current sensors). Voltage probes are disclosed and include placement of conductive pickup elements near current carrying conductors. The conductive pickup elements may be insulated from the current carrying conductors by insulative material of stepped insulators surrounding the current carrying conductors and/or insulative material of PCB voltage probes. The PCB voltage probes are integrally formed as part of respective PCBs and extend from the PCBs and into the corresponding stepped insulators. The PCB voltage probes may respectively contact corresponding current carrying conductors.

The conductive pickup elements in combination with the current carrying conductors and the insulative material between the conductive pickup elements and the current carrying conductors provide respective integrated PCB primary divider capacitors. This reduces cost, by reducing the number of discrete capacitors associated with voltage sensing. By incorporating conductive pickup elements in a PCB and corresponding traces and/or shields, metallization of the PCBs provides precise alignment and calibration of conductive elements. Shielding and trace routing embedded in the PCBs also provides high voltage clearance and creepage distances. Voltage clearance and creepage distances refer to the shortest outer surface distances along a dielectric surface between potentials of two conductive elements. As an example, a voltage clearance and creepage distance may refer to a distance between a current carrying conductor and a trace, wire and/or other conductive element of a voltage probe along an outer perimeter of a stepped insulator, as further described below.

The VI probe assemblies disclosed herein also include current probes for measuring magnetic fields of current carrying conductors. The VI probe assemblies include PCB shielding, which may be embedded, for reduction in electric field crosstalk. The shielding prevents coils of the current probes from picking up voltages of the current carrying conductors while allowing detection of magnetic fields. The coils are differential transformer coupled to reduce electric field cross talk.

The example voltage probes disclosed here have low sensitivity to stray field pick-up because the voltage probes are small and shielded. The voltage probes are configured to provide primary divider capacitors instead of including separate discrete capacitors. Discrete primary and secondary divider capacitors and associated wiring can be expensive and difficult to manufacture. In some examples, high voltage creepage and clearance issues are overcome with the use of high dielectric strength PCB material to form primary divider capacitors including encapsulated shielding. Low inductance exists between current carrying conductors and outputs of the primary divider capacitors formed by the current carrying conductors and pickup elements of the voltage probes. The low inductance provides improved pulse responsiveness including fast dynamic responses to satisfy pulsed RF monitoring. Low cost voltage and current sensors are disclosed without elaborate shielding. The PCB examples allow for easy mechanical alignment and simple calibration of the voltage sensors.

FIG. 1 shows a portion 100 of a substrate processing system including a VI probe assembly 102 that is coupled to an RF source 104 and detects a voltage on and a current level of a current carrying conductor 106 (e.g., a RF feed rod, single conductor line, dual conductor line, etc.). The current carrying conductor 106 may extend into an enclosure 108 and feed RF current to various components located therein including, e.g., coils, electrodes, a plasma chamber, etc. The enclosure 108 may be a junction box, a coil enclosure, a chamber, a chassis, and/or other substrate processing system enclosure. Examples of the VI probe assembly are shown and described below with respect to FIGS. 2-24.

In the example shown, the VI probe assembly 102 is disposed in a chassis 110 and includes a mounting plate 112, which is connected to the chassis 110 and to a PCB 114. The PCB 114 may be connected to a stepped insulator 116, which is mounted on and surrounds the current carrying conductor 106. The stepped insulator 116 may be mounted to a plate 118 of the chassis 110.

The PCB 114 may include shields that shield circuit components mounted on one side of the PCB 114 from voltage of the current carrying conductor 106 and high voltage RF components 120 disposed near an opposite side of the PCB 114. Example shields are shown in FIGS. 4-7.

Figure 2:
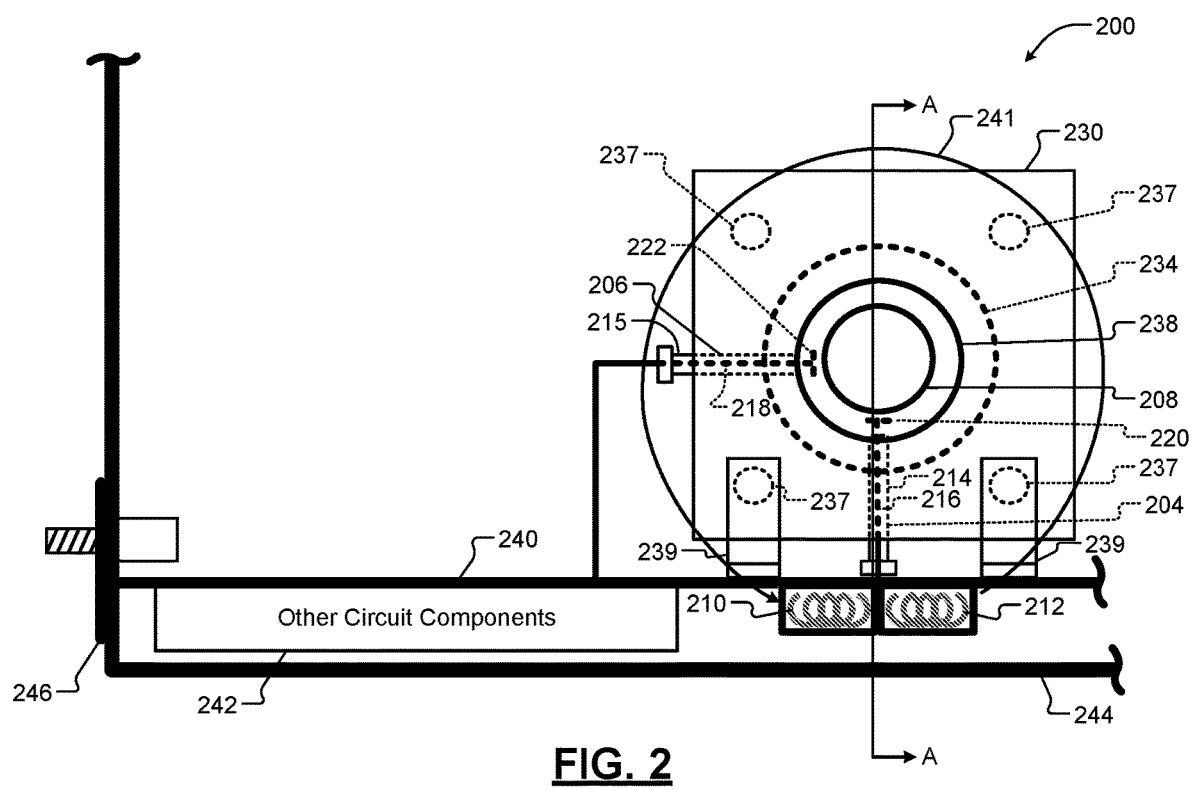
FIG. 2 is a front view of an example VI probe assembly including a stepped insulator with an internally disposed voltage probe in accordance with the present disclosure.
Figure 3:
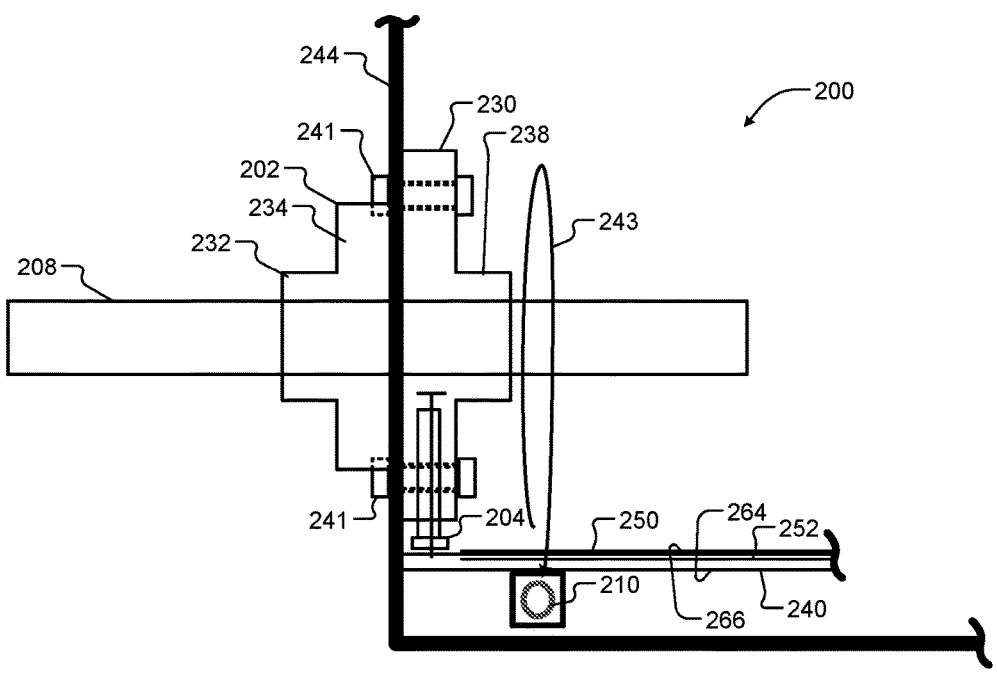
FIG. 3 is a side cross-sectional view of the VI probe assembly of FIG. 2 taken at section line A-A.

FIGS. 2-3 show a VI probe assembly 200 including a stepped insulator 202 with one or more internally disposed voltage probes (e.g., voltage probes 204, 206). Each of the voltage probes may be disposed at one of multiple possible locations. The VI probe assembly 200 may be implemented in the examples of FIGS. 1, 23, and 24 and other applications where voltage and current probes are used to detect RF voltage and current in current carrying conductors. In FIG. 2, multiple voltage probes 204, 206 are shown to illustrate different possible locations of a voltage probe. In one embodiment, the VI probe assembly 200 includes a single voltage probe, which may be located in any location 360° around a current carrying conductor 208 (e.g., a RF feed rod). Minimal or no gap may exist between the current carrying conductor 208 and the stepped insulator 202. As an example, the voltage probe may be disposed adjacent to and/or near a current probe. In the example shown, the current probe is implemented as multiple pickup coils 210, 212.

The voltage probes 204, 206 include outer dielectric members 214, 215 with inner conductive elements 216, 218 (e.g., wires) that extend through the outer dielectric members 214, 215 and to conductive pickup elements 220, 222. The outer dielectric members 214, 215 may be cylindrically-shaped. The conductive pickup elements 220, 222 may be formed of a metallic material and are disposed close to the current carrying conductor 208, but are not in contact with the current carrying conductor 208. Each of the voltage probes 204, 206 may be inserted within a hole of the stepped insulator 202. Dielectric material of the stepped insulator 202 is disposed between a radially innermost end of the conductive pickup elements 220, 222 and the current carrying conductor 208. As an example, the conductive pickup elements 220, 222 may be disposed a very short distance from the current carrying conductor 208.

The stepped insulator 202 is formed of dielectric material. The stepped insulator 202 may include a mounting block 230 and multiple annular ring-shaped members 232, 234, 238. In an embodiment, the mounting block 230 and multiple annular ring-shaped members 232, 234, 238 are integrally formed as a unitary structure, as shown. The current carrying conductor 208 extends through holes in the mounting block 230 and the annular ring-shaped members 232, 234, 238. In an embodiment, the voltage probe (one of the voltage probes 204, 206) is inserted in the mounting block 230 of the stepped insulator 202, but may be disposed in the annular ring-shaped member 238. Although in the example shown the stepped insulator 202 has three annular ring-shaped members, the stepped insulator 202 may have any number of annular ring-shaped members. Although shown as having a stepped cross-section, the cross-section of the insulator 202 may have a different shaped outer perimeter that provides a longer or increased voltage clearance and creepage distance, as compared to a shortest linear path along an outer perimeter of the insulator 202 between the current carrying conductor 208 and a conductive element of one of the voltage probes 204, 206. The outer perimeter of the insulator 202 may have an irregular non-stepped shape that does not provide a linear path between potentials of two conductive elements (e.g., between potentials of the current carrying conductor 208 and a trace, wire and/or other conductive element of one of the voltage probes 204, 206).

The mounting block 230 may include holes 237 through which fasteners may extend to attach the mounting block 230 to, for example, (i) mounting brackets 239 that may be attached to the PCB 240, and/or (ii) a plate of a chassis (e.g., chassis 244) or other supporting plate. The mounting brackets 239 are shown in FIG. 2 and are not shown in FIG. 3. The fasteners may include, for example, bolts and corresponding nuts. Example fasteners 241 are shown in FIG. 3.

The annular ring-shaped members 232, 234, 236 may have different outer diameters. In one embodiment, the annular ring-shaped members of a first side of the mounting block 230 have different outer diameters and the annular ring-shaped members on a second side of the mounting block 230, opposite the first side, have different outer diameters. One or more of the annular ring-shaped members on the first side may have the same sized outer diameters as one or more of the annular ring-shaped members on the second side.

The coils 210, 212 are mounted on a PCB 240 opposite the voltage probe(s) and the stepped insulator 202. The coils 210, 212 provide indirect current sensing and detect a magnetic field 243 generated by the current carrying conductor 208. The coils 210, 212 and voltage probe(s) are connected to the PCB 240, which includes other signal conditional components 242 that are mounted on a same side of the PCB 240 as the coils 210, 212. The PCB 240 may be mounted to a chassis 244 via a mounting plate 246. The material of the PCB 240 is disposed in a plane that extends parallel to the current carrying conductor 208 and radially away from a center of the magnetic field 243.

The voltage probe(s) and current probe in combination with the other signal conditioning components 242 operate as voltage and current sensors. The current sensor as well as other current sensors disclosed herein use a series connected set of coils (e.g., the coils 210, 212) that are differential transformer connected. See, for example, the transformer of the signal conditioning components shown in FIG. 22.

The coils 210, 212 may also be shielded using PCB-based shields, as shown in FIGS. 3, 5, 7, 20 and 22. The PCB-based shields may be external layers of the PCB 240 and/or embedded within the PCB 240. As an example, the shields may include a RF return reference shield 250 and a ground reference shield 252, which may be formed of, for example, copper (Cu). The shields 250, 252 may be external to and/or embedded in the PCB 240 and reduce electric field coupling to coils 210, 212. The shields 250, 252 shield circuit components disposed on a first side 264 of the PCB 240 from high voltage RF components disposed near an opposite side 266 of the PCB 240. Because the coils 210, 212 are on the same side of the PCB 240 and are close to each other, the coils 210, 212 are both exposed to the same stray field, which is rejected by the transformer coupling. In addition, by having the coils 210, 212 on a same side of the PCB 240 and close together makes embedded shielding very effective. The coils 210, 212 are not located close to the current carrying conductor 208, such that the shielding of the coils 210, 212 does not interfere with voltage sensing and/or attenuate a voltage sensor signal.

Figure 4:
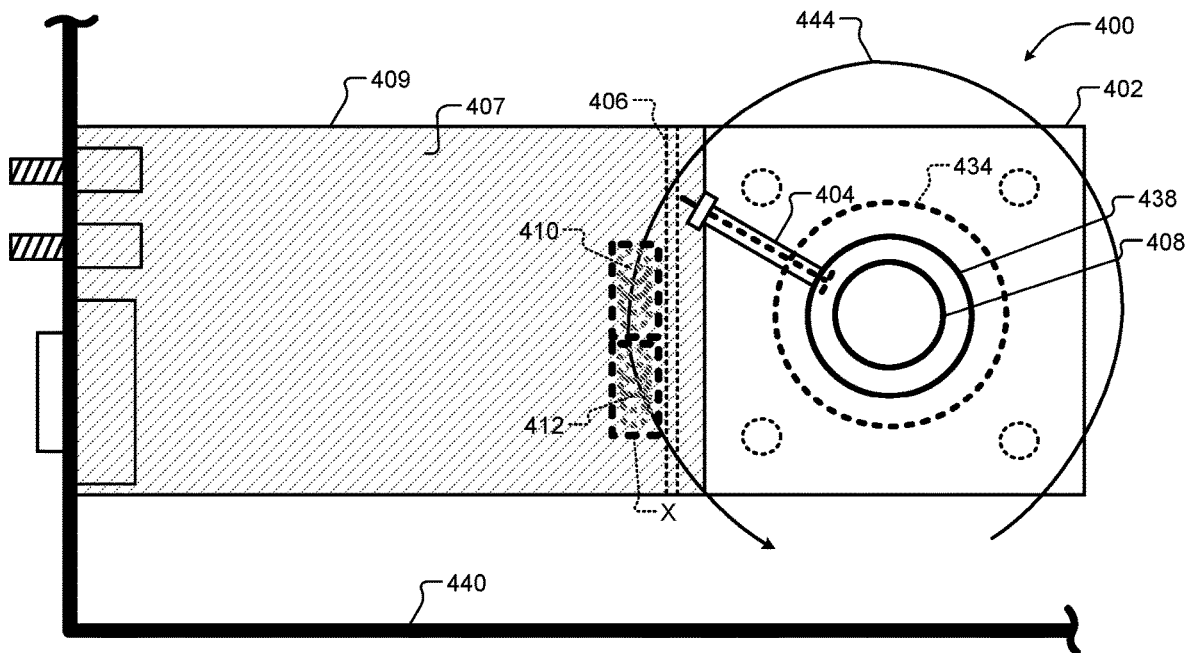
FIG. 4 is a front view of another example VI probe assembly including a stepped insulator with an internally disposed voltage probe and multiple voltage shields in accordance with the present disclosure.
Figure 5:
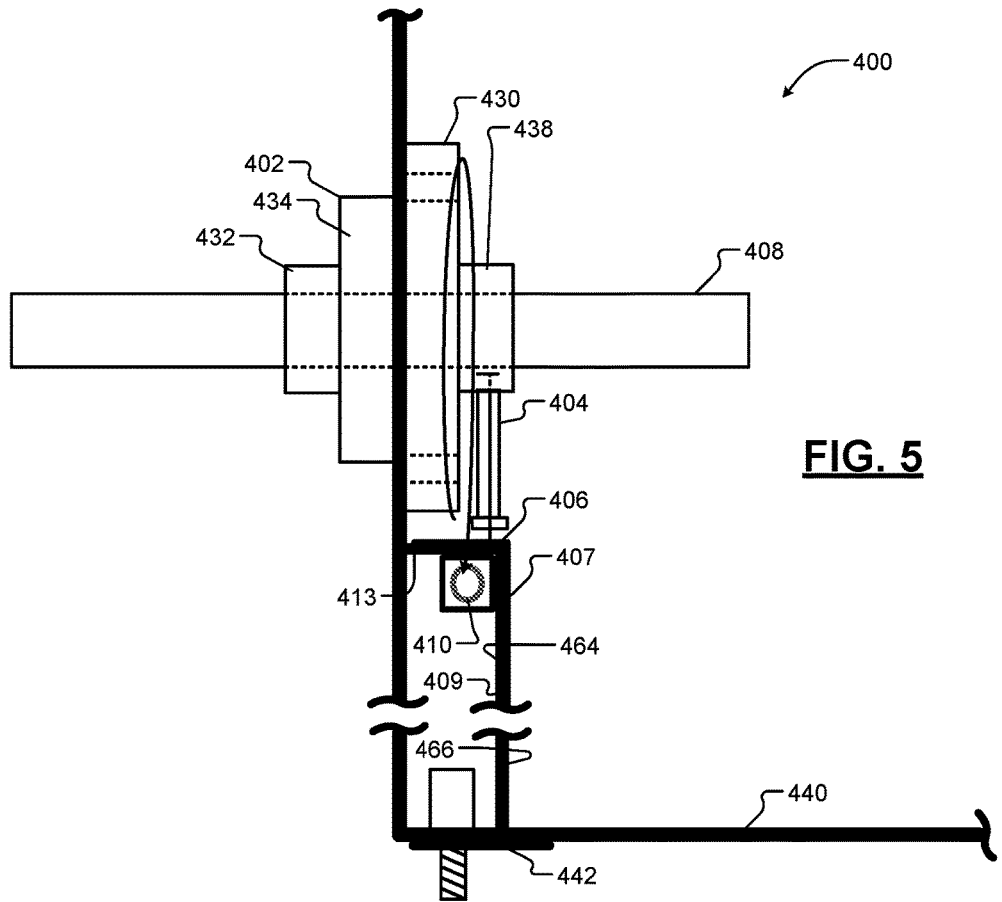
FIG. 5 is a top view of the VI probe assembly of FIG. 4.
Figure 6:
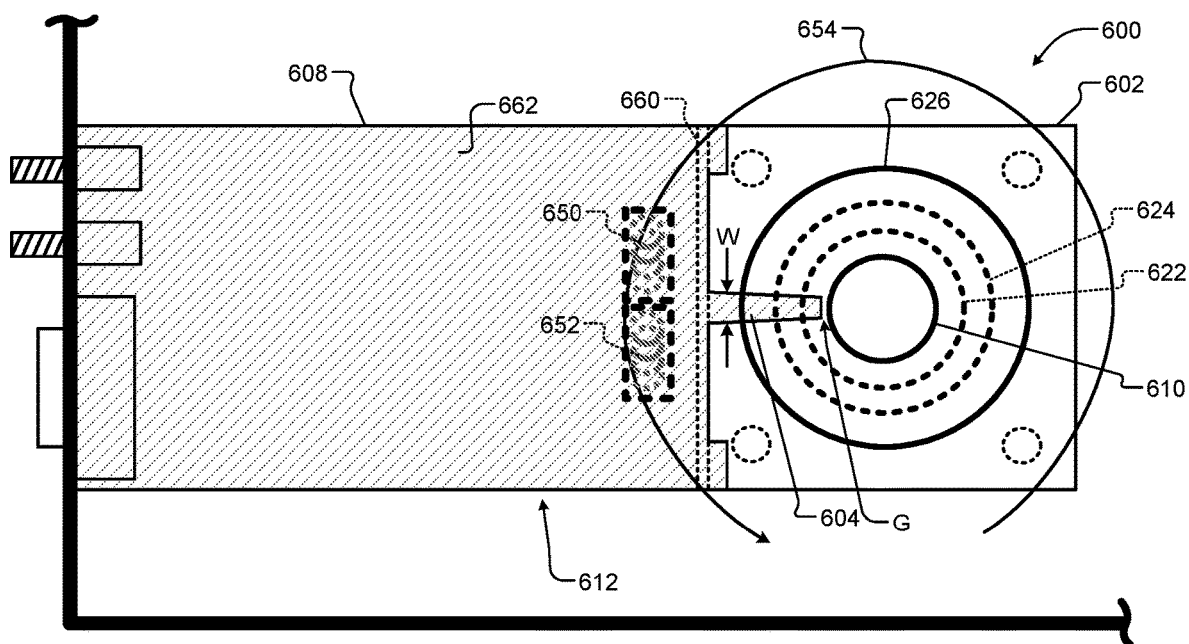
FIG. 6 is a front view of another example VI probe assembly including a stepped insulator with an internally disposed voltage probe having a conductive pickup element embedded in a printed circuit board (PCB) in accordance with the present disclosure.
Figure 7:
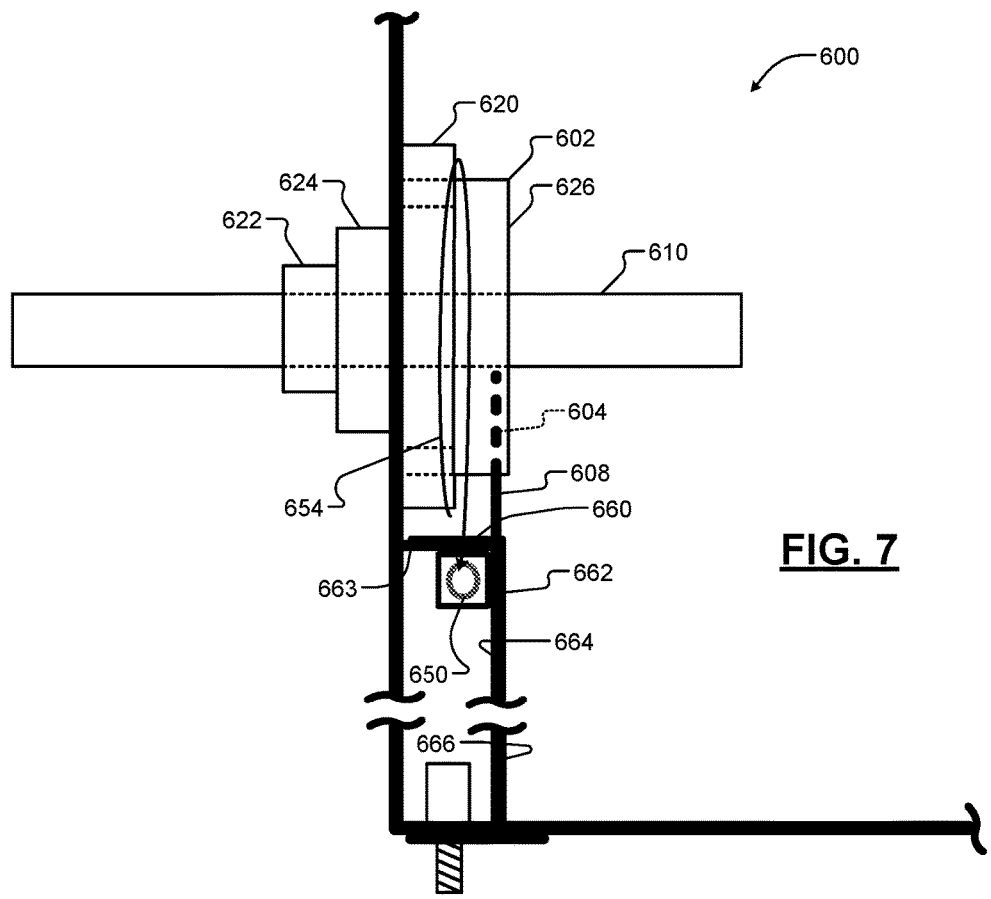
FIG. 7 is a top view of the VI probe assembly of FIG. 6.

FIGS. 4-5 show a VI probe assembly 400 including a stepped insulator 402 with an internally disposed voltage probe 404 and multiple voltage shields 406, 407. The VI probe assembly 400 is similar to the VI probe assembly 200 of FIGS. 2-3. The voltage probe 404 may be disposed at any 360° location around a current carrying conductor 408 and is connected to a PCB 409. Minimal or no gap may exist between the current carrying conductor 408 and the stepped insulator 402. Current probe coils 410, 412 are disposed on an opposite side of the PCB 409 as the stepped insulator 402 and the voltage probe 404. The voltage shield 406 is disposed between the coils 410, 412 and the current carrying conductor 408 and may be on or embedded in a PCB 413. Although a single shield is shown on the PCB 413, the PCB 413 may include RF return and ground reference shields. The PCB 413 extends perpendicular to the PCB 409 and may be attached to the PCB 409. The voltage shields 406, 407 shield circuit components disposed on a first side 464 of the PCB 409 from high voltage RF components disposed near an opposite side 466 of the PCB 409. Although a single shield is shown on the PCB 409, the PCB 409 may include RF return and ground reference shields, which may be connected to the RF return and ground reference shields of the PCB 413. The stepped insulator 402 includes a mounting block 430 and annular members 432, 434, 438. The voltage probe 404 is disposed in the annular member 438. The PCB 409 may be mounted to a chassis 440 via a mounting plate 442.

The coils 410, 412 are mounted on the PCB 409 opposite the voltage probe 404 and the stepped insulator 402. The coils 410, 412 provide indirect current sensing and detect a magnetic field 444 generated by the current carrying conductor 408.

FIGS. 6-9 shows a VI probe assembly 600 including a stepped insulator 602 with an internally disposed PCB voltage probe 604 having an embedded conductive pickup element 606, which may be formed of a metallic material. The PCB voltage probe 604 is used to detect a voltage of a current carrying conductor 610, which extends through the stepped insulator 602. Minimal or no gap G may exist between the current carrying conductor 610 and the stepped insulator 602. A PCB 608 of the VI probe assembly 600 includes the PCB voltage probe 604, which is a narrow outward protruding portion of the PCB 608. The outward protruding portion is disposed within a blind hole 609 (shown in FIG. 8) of the stepped insulator 602 and extends from a main portion 612 of the PCB 608. The PCB voltage probe 604 may be referred to as a "snout". As an example, the PCB voltage probe 604 may be tapered, such that a width W of the PCB voltage probe 604 decreases in size from the main portion 612 of the PCB 608 towards the current carrying conductor 610. In another example, the PCB voltage probe 604 is not tapered such that side edges of the PCB voltage probe are parallel to each other. The width W for the parallel arrangement may be, for example, less than an inch.

The stepped insulator 602 may include a mounting block 620 and annular members 622, 624, 626. In the example shown, the PCB voltage probe 604 is disposed in the annular member 626, but may be disposed in the mounting block 620.

Figure 8:
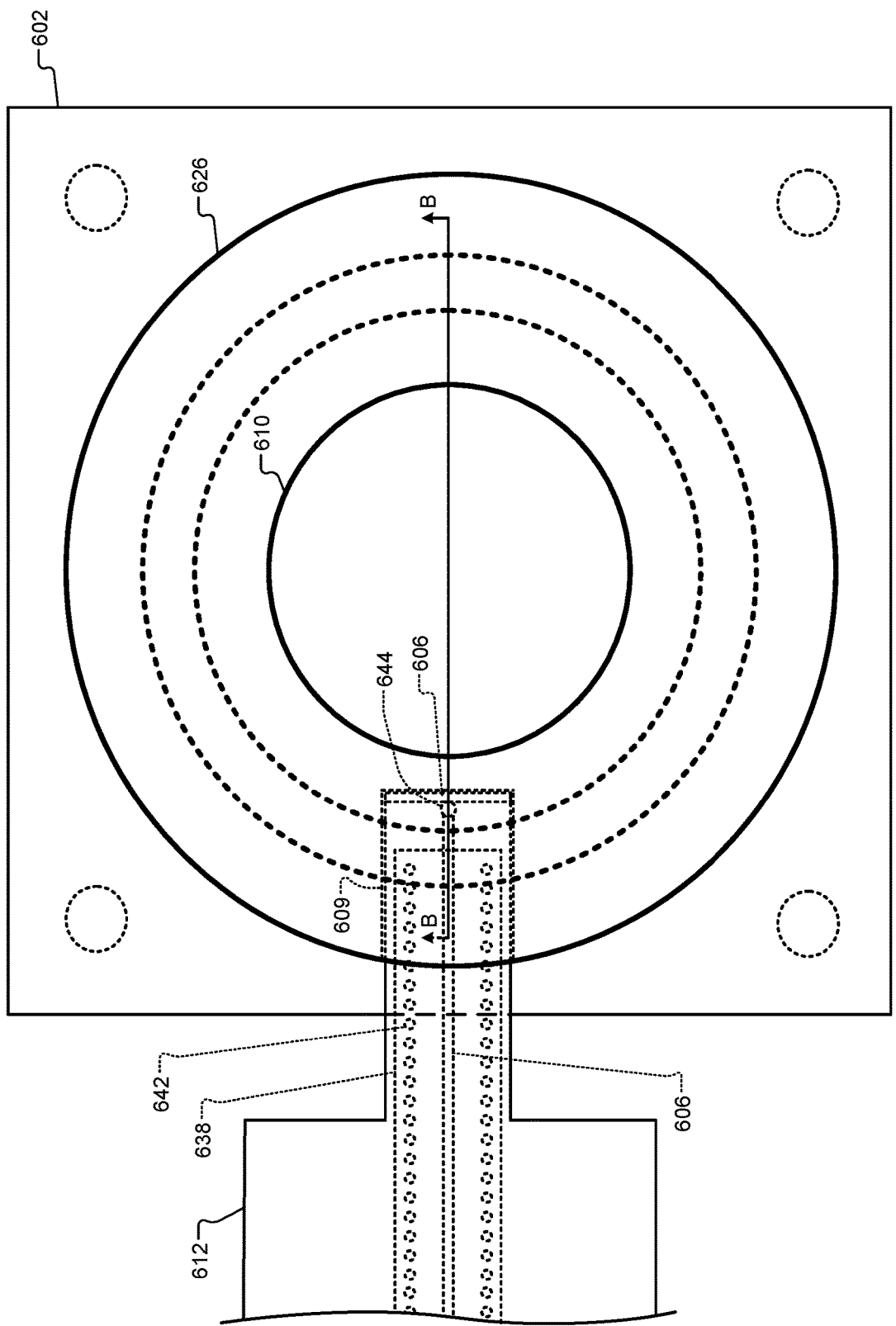
FIG. 8 is a front view of a portion of the VI probe assembly of FIG. 6.
Figure 9:
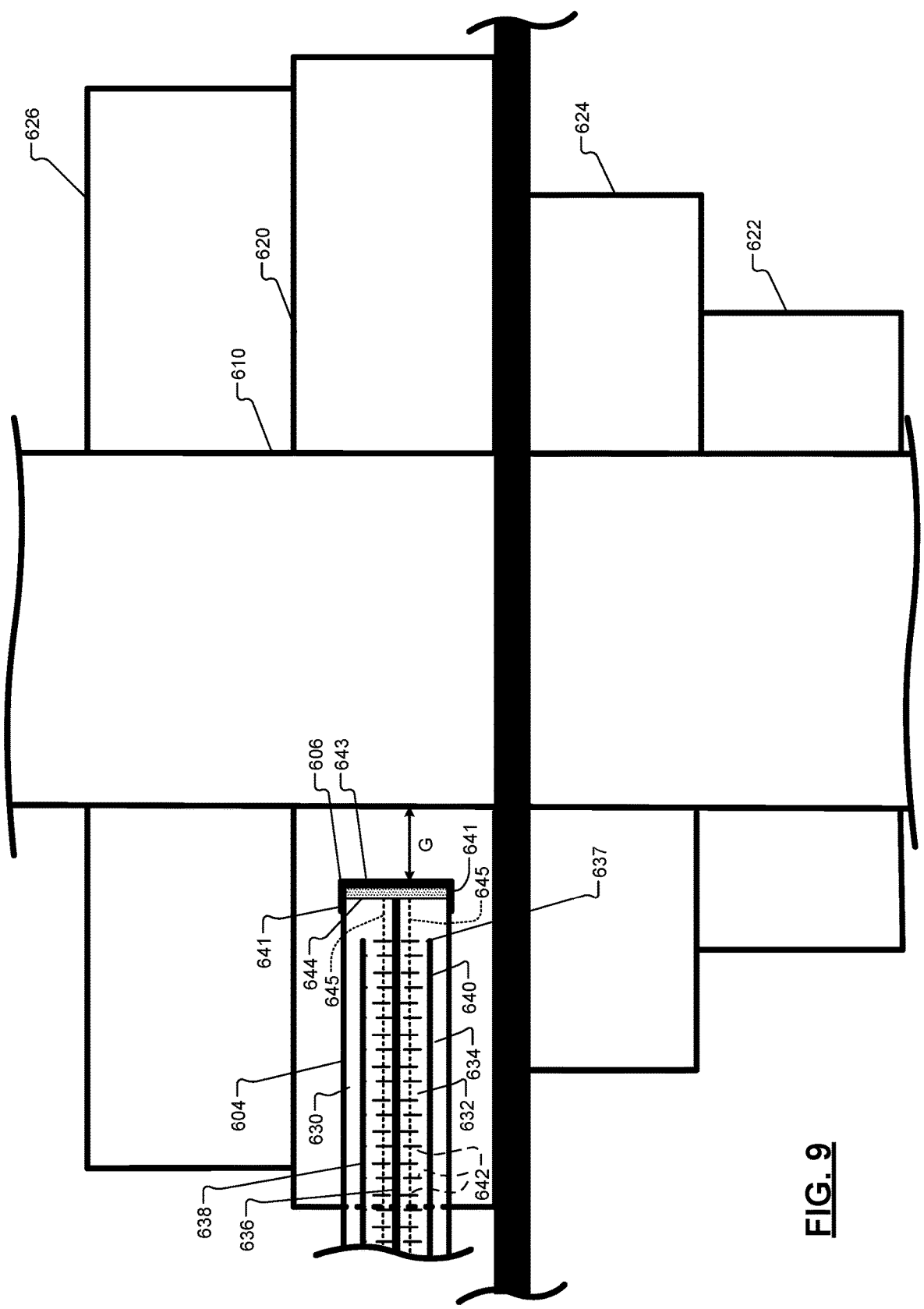
FIG. 9 is a top view of a portion of the VI probe assembly of FIG. 6 taken at section line B-B of FIG. 8.

The PCB voltage probe 604 may include multiple layers including multiple dielectric layers 630, 632, 634, an embedded trace 636, and the conductive pickup element 606, examples of which are shown in FIGS. 8 and 9. The dielectric layers 630, 632, 634 may be formed of plastic. The PCB voltage probe 604 may further include a shield 637 including a pair of shield layers 638, 640 connected by conductive vias 642. The shield layers 638, 640 may be connected to a ground reference potential terminal. In one embodiment, the conductive pickup element 606 is implemented as an end cap disposed on an end of the PCB voltage probe 604 and includes radial extending outer conductive elements 641 and an axially extending conductive element 643. A via 644 may be disposed between and connect the radially extending outer conductive elements 641. A gap G exists between the axially extending element 643 of the PCB voltage probe 604 and the current carrying conductor 610. Dielectric material of the stepped insulator may be disposed in the gap G between the axially extending element 643 and the current carrying conductor to provide a barrier at the bottom of the blind hole. The gap G may be nonexistent (or zero) or be greater than zero, as shown. The vias 642, 644 and/or the axially extending element 643 may extend parallel to each other. The via 644 may contact the axially extending element 643 and the embedded trace 636. In another embodiment, the embedded trace 636 is replaced with two parallel extending traces that are connected and embedded in the PCB voltage probe 604. A dielectric layer is disposed between the traces. The two traces provide symmetry and contact the via 644. Dashed lines 645 represent the two traces.

The VI probe assembly 600 includes coils 650, 652 that are mounted on the PCB 608. The coils 650, 652 provide indirect current sensing and detect a magnetic field 654 generated by the current carrying conductor 610. The VI probe assembly 600 further includes voltage shields 660, 662 that may be on or embedded in PCBs 663, 608. The voltage shield 660 is disposed between the coils 650, 652 and the current carrying conductor 610. Although a single shield is shown on the PCB 663, the PCB 663 may include RF return and ground reference shields. The PCB 663 extends perpendicular to the PCB 608 and may be attached to the PCB 608. The voltage shields 660, 662 shield circuit components disposed on a first side 664 of the PCB 608 from high voltage RF components disposed near an opposite side 666 of the PCB 608. Although a single shield is shown on the PCB 608, the PCB 608 may include RF return and ground reference shields.

FIGS. 10-12 show a PCB voltage probe 1000 and a portion of a corresponding stepped insulator 1002 that may be used as part of one or more of the VI probe assemblies disclosed herein. The PCB voltage probe 1000 is disposed through a thru-hole 1003 of the stepped insulator 1002 and used to satisfy voltage creepage requirements. The PCB voltage probe 1000 includes (i) a pickup element 1004 connected to a trace 1005, and (ii) a shield 1006. The pickup element 1004 is arched, conductive and embedded in dielectric material of the PCB voltage probe 1000. The shield 1006 is conductive and includes two shield layers 1010, 1012 and conductive vias 1014 connecting the shield layers 1010, 1012. The shield layers 1010, 1012 may be connected to ground and/or a reference potential terminal. The pickup element 1004 includes multiple vias 1020 connected by conductive elements 1022. A center one of the vias 1020 is designated 1024 and is connected to the conductive trace 1005. In another embodiment, the conductive trace 1005 is replaced with two parallel extending traces that are connected and embedded in the PCB voltage probe 1000. A dielectric layer is disposed between the traces. The two traces provide symmetry and may contact the via 1024. Dashed lines 1007 represent the two traces.

The PCB voltage probe 1000 has an arched end 1030 that has similar shape as the pickup element 1004 and as an outer periphery of a current carrying conductor 1032. The arched end 1030 is formed of dielectric material and can be placed in direct contact with the current carrying conductor 1032. The shape of the arched end 1030 matches the shape of the opposing portion of the current carrying conductor 1032. The dielectric material of the PCB voltage probe 1000 between the pickup element 1004 and the arched end 1030 provide a separation (or isolation) region 1040 between the pickup element 1004 and the current carrying conductor 1032. Dimensions of the isolation region 1040 can be easily set during design and manufacturing of the PCB voltage probe 1000.

FIGS. 13-15 show a PCB voltage probe 1300 and a portion of a corresponding stepped insulator 1302 that may be used as part of one or more of the VI probe assemblies disclosed herein. The PCB voltage probe 1300 is disposed a thru-hole 1303 of the stepped insulator 1302. The PCB voltage probe 1300 includes (i) an arched pickup element 1304 connected to a trace 1305, and (ii) a shield 1306. The pickup element 1304 includes an outer conductive end 1309 that is 'C'-shaped and an inner portion 1311, which is embedded in dielectric material of the PCB voltage probe 1300 and forms a capacitor with the outer conductive end 1309. The outer conductive end 1309 includes two parallel members 1312, 1314 and an arched center member 1316 that are conductive and attached to an end of the PCB voltage probe 1300. The inner portion 1311 includes a pair of conductive elements 1318 and a via 1320. In an embodiment, the pair of conductive elements 1318 are elliptical shaped, as shown, but may have other shapes. The via 1320 is connected to the conductive trace 1305.

The shield 1306 is conductive and includes two shield layers 1330, 1332 and conductive vias 1334 connecting the shield layers 1330, 1332. The shield layers 1330, 1332 may be connected to ground and/or a reference potential terminal. The shield layers 1330 may be in same layers as the pair of conductive elements 1318.

The arched center member 1316 can be placed in direct contact with the current carrying conductor 1332. The shape of the arched center member 1316 matches the shape of the opposing portion of the current carrying conductor 1332. The inner portion 1311, the outer conductive end 1309 and the dielectric material of the PCB voltage probe 1300 between the inner portion 1311 and the outer conductive end 1309 can be easily set during design and manufacturing of the PCB voltage probe 1300. Although with this configuration, precise mechanical alignment of the PCB voltage probe 1300 relative to the current carrying conductor 1332 is not important because the metallization of the PCB (or the arched center member 1316) makes direct contact to the current carrying conductor 1332. The configuration of FIGS. 13-15 may be modified to include a compliant RF conductive element (e.g., a gasket or a spring) between the arched center member 1316 and the current carrying conductor 1332. Examples of a compliant RF conductive element are shown in FIGS. 16-19.

Figures 16, 17, 18:
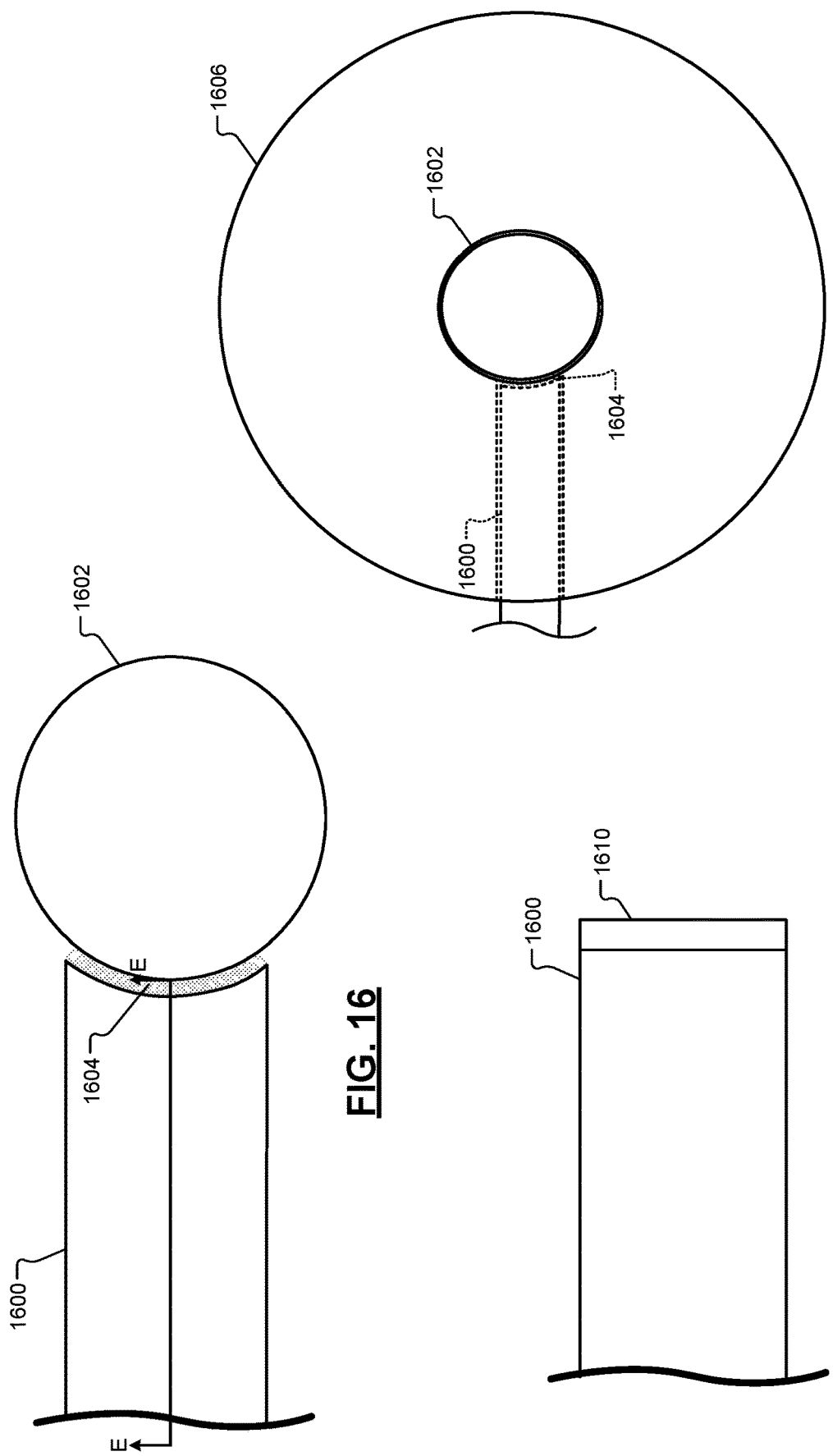
FIG. 16 is front view of another example PCB voltage probe and a compliance contact spring in accordance with the present disclosure.
FIG. 17 is a side cross-sectional view of the PCB voltage probe of FIG. 16 taken at section line E-E of FIG. 16.
FIG. 18 is a front view of the PCB voltage probe of FIG. 16 disposed in an insulator.

FIGS. 16-18 shows a PCB voltage probe 1600, a current carrying conductor 1602 and a compliant RF conductive element 1604 in the form of a compliance contact spring. The current carrying conductor 1602 extends through an insulator 1606, which may be configured similarly as other insulators disclosed herein. The compliant RF conductive element 1604 provides and maintains good contact between a conductive end 1610 of the PCB voltage probe 1600 and the current carrying conductor 1602 across the outer surface of the conductive end 1610. The compliant RF conductive element 1604 may extend circumferentially around a portion of the current carrying conductor 1602. This configuration provides compliant current carrying conductor contact to compensate for mechanical mounting tolerances.

Figure 19:
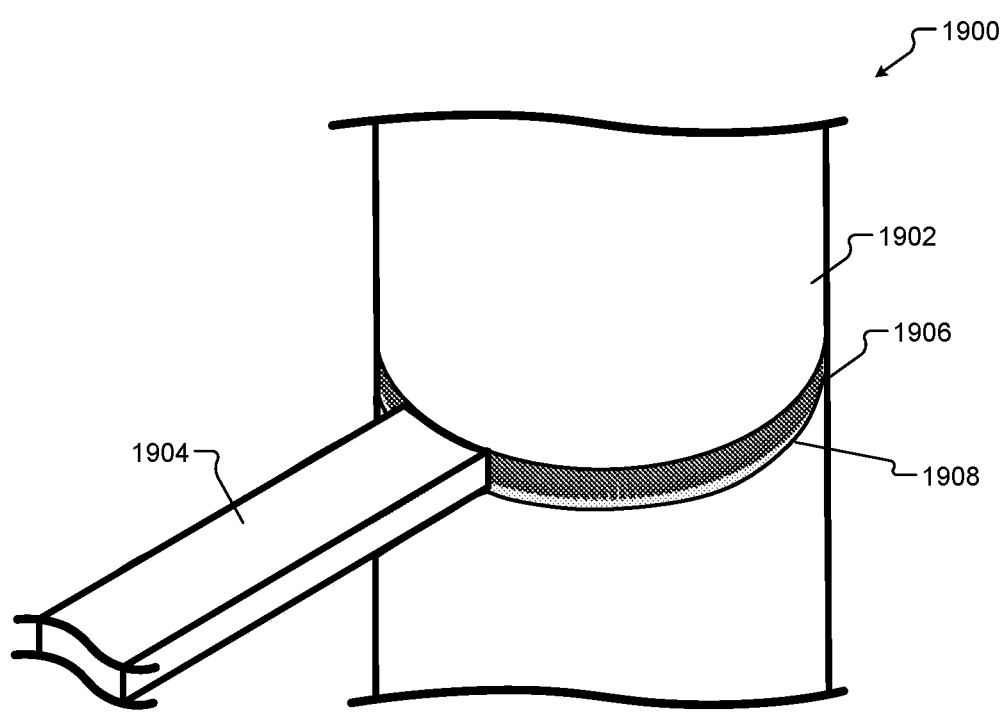
FIG. 19 is a perspective view of an example portion of a slotted current carrying conductor and a PCB voltage probe including a compliance contact O-ring spring in accordance with the present disclosure.

FIG. 19 shows a portion 1900 of a slotted current carrying conductor 1902 and a PCB voltage probe 1904 including a compliant RF conductive element 1906 in the form of a compliant contact O-ring spring. The compliant RF conductive element 1906 is disposed in a slot 1908 and extends around a perimeter of the current carrying conductor 1902.

Figure 20:
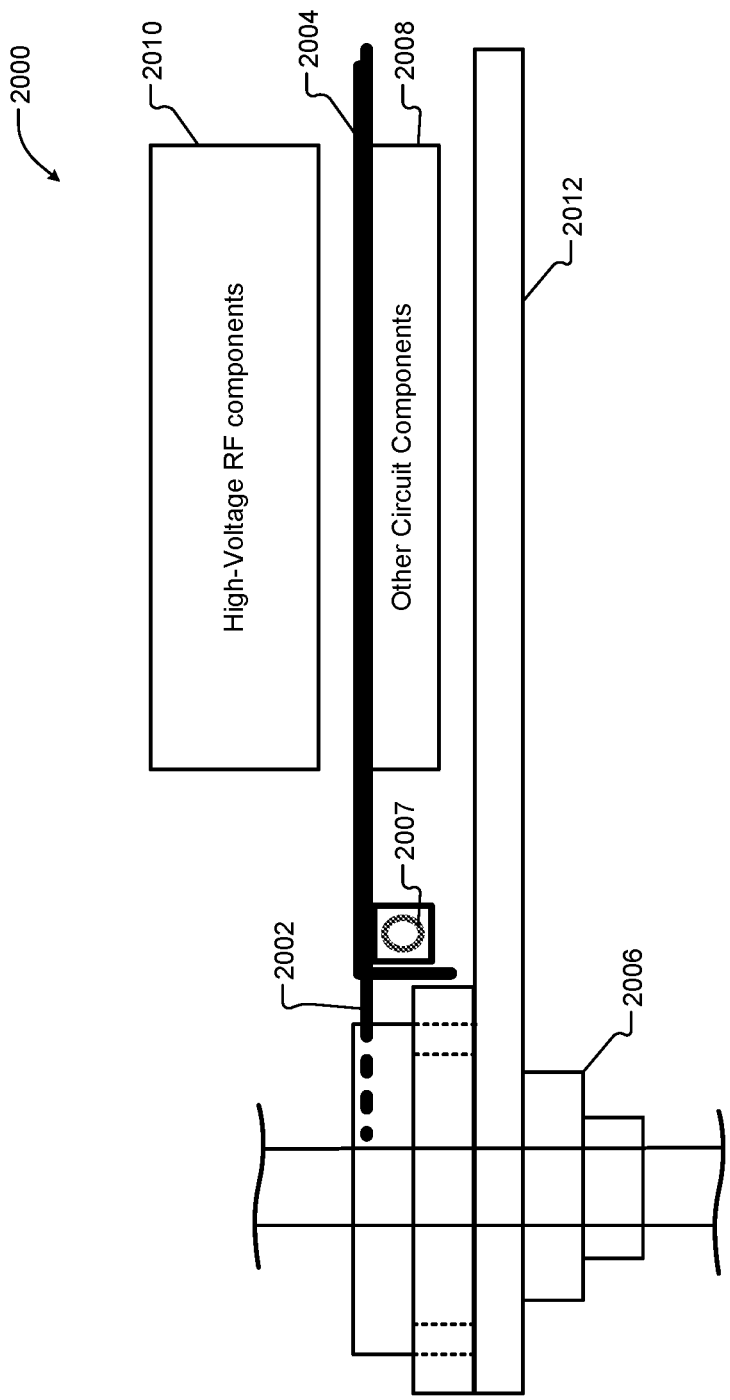
FIG. 20 is a top view of another example VI probe assembly including a PCB with a shield layer in accordance with the present disclosure.

FIG. 20 shows a VI probe assembly 2000 including a PCB 2002 with a shield layer 2004. The PCB 2002 extends into a stepped insulator 2006. Coils 2007 and other circuit components 2008 are mounted to a first side of the PCB 2002 opposite high-voltage RF components (e.g., capacitors) 2010. The shield layer 2004 may be disposed on or embedded in the PCB 2002 and shields the coils 2007 and the circuit components 2008 from the high-voltage RF components 2010. The stepped insulator 2006 may be attached to a supporting plate 2012. The PCB 2002 may be configured as any of the PCB voltage probes disclosed herein. The other circuit components 2008 may include signal conditioning components, examples of which are shown in FIG. 22.

Figure 21:
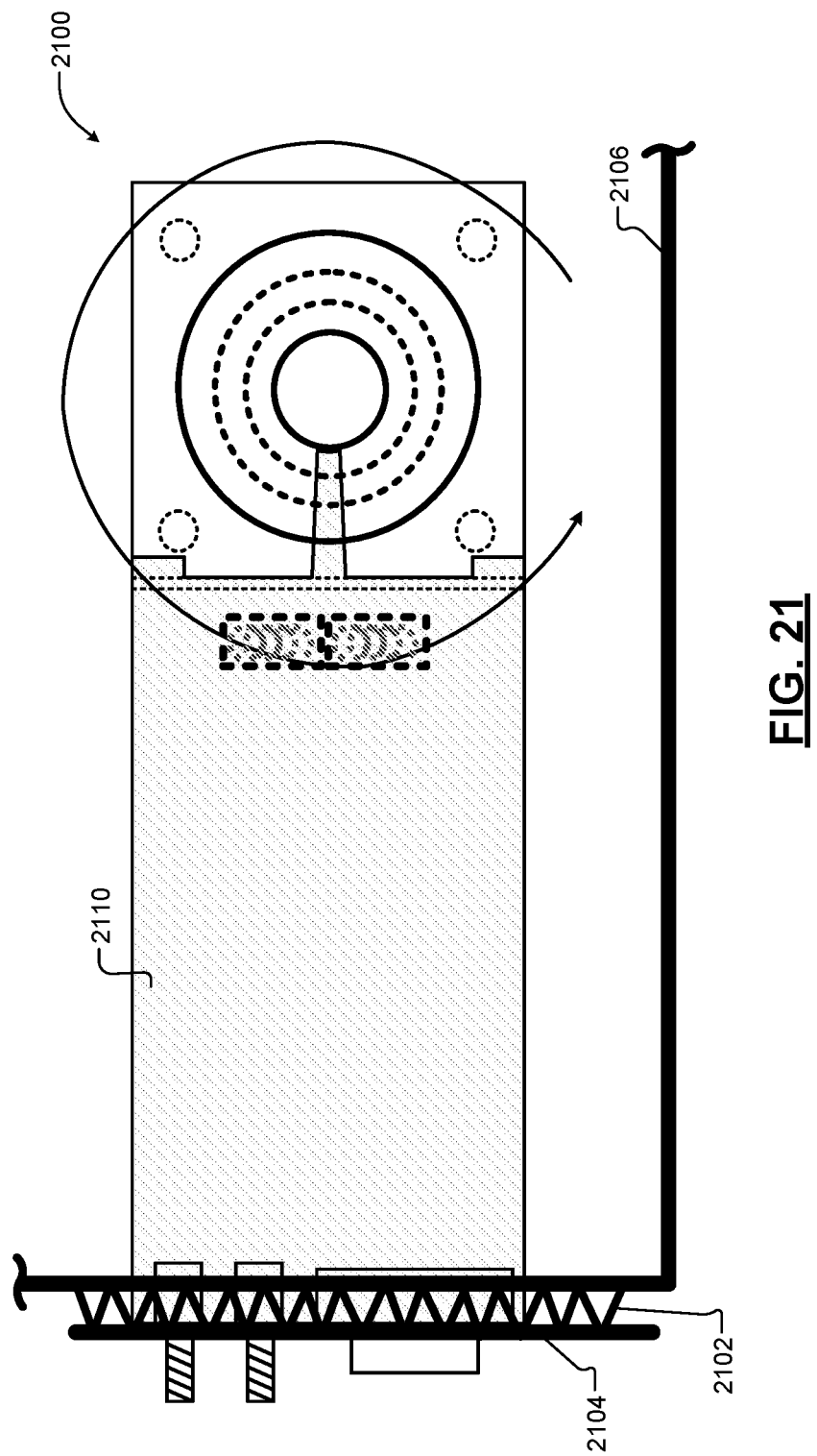
FIG. 21 is a front view of another example VI probe assembly including a RF gasket between a mounting plate and a chassis in accordance with an embodiment of the present disclosure.

FIG. 21 shows a VI probe assembly 2100 including a RF gasket 2102 between a mounting plate 2104 and a chassis 2106. The RF gasket 2102 is conductive and aids in maintaining a good conductive seal between the mounting plate 2104 and the chassis 2106. A ground reference shield and/or ground reference terminal of a PCB 2110 of the VI probe assembly 2100 may be connected to the chassis 2106 via the RF gasket 2102 and the mounting plate 2104.

Figure 22:
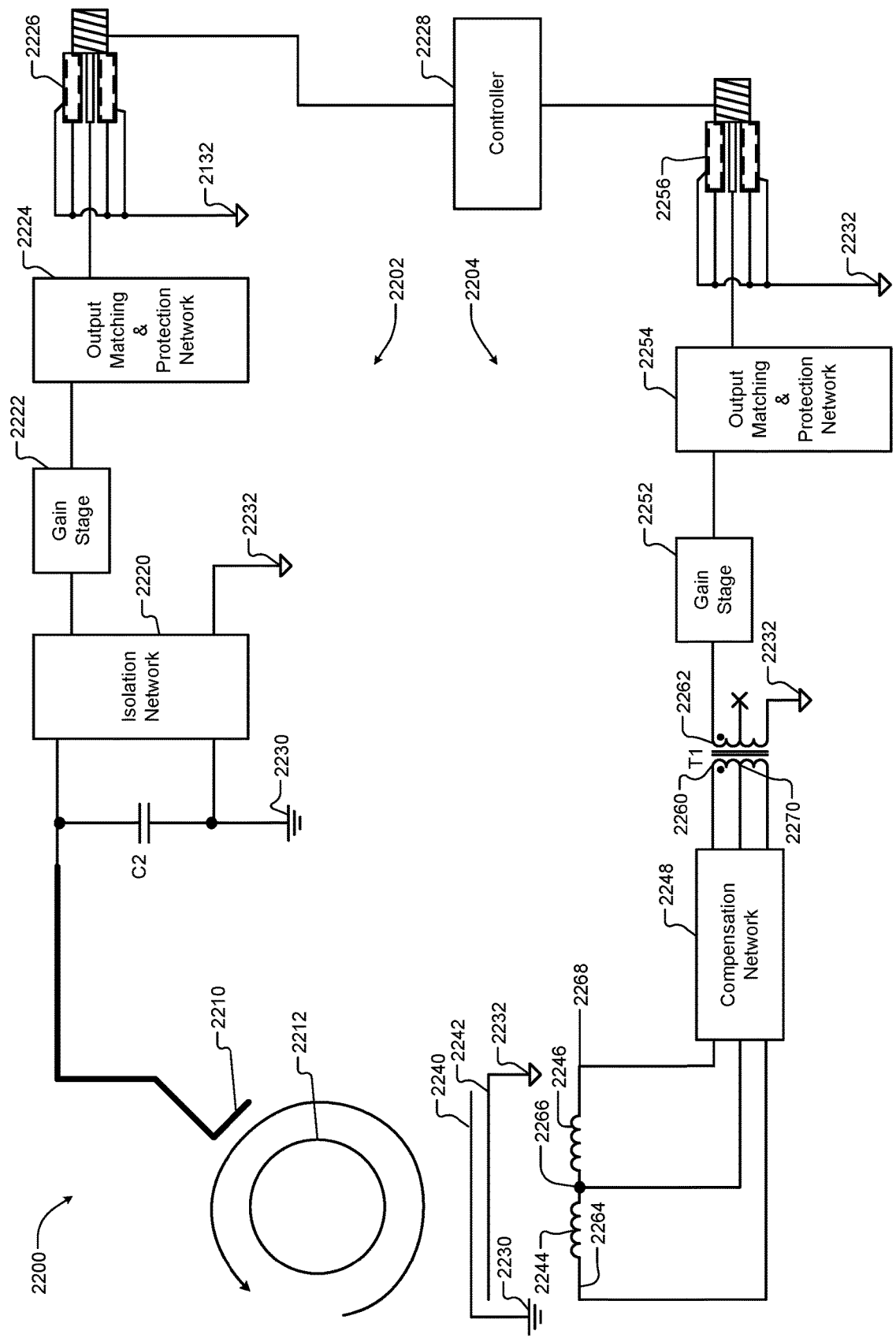
FIG. 22 is a schematic view of an example VI probe assembly circuit in accordance with an embodiment of the present disclosure.

FIG. 22 shows an example VI probe assembly circuit 2200, which may be connected to any of the voltage probes and current probes disclosed herein. The shown circuit components and elements of the VI probe assembly circuit 2200 may be mounted on, embedded in, and/or connected to the PCBs disclosed herein. The VI probe assembly circuit 2200 includes signal conditioning circuit components, which are shown for example purposes. Other signal conditioning circuit components and configurations may be utilized.

The VI probe assembly circuit 2200 includes a voltage sensing path 2202 and a current sensing path 2204. The voltage sensing path 2202 includes a pickup element 2210, such as any of the pickup elements disclosed herein. The pickup element 2210 is used to detect a voltage on a current carrying conductor 2212. The voltage sensing path 2202 includes: a primary divider capacitor provided by the pickup element 2210 and the current carrying conductor 2212; a secondary divider capacitor C2; an isolation network 2220; a gain stage 2222; an output matching and protection network 2224; and a coaxial connector 2226, which may be connected to a controller 2228. The capacitor C2 and the isolation network 2220 are connected to an RF return reference terminal 2230. The isolation network 2220 is also connected to a ground reference terminal 2232. A voltage across the capacitor C2 is detected by the isolation network 2220 and then amplified by the gain stage 2222. The output of the gain stage 2222 is provided to the output matching and protection network 2224, which provides impedance matching between the gain stage 2222 and the coaxial connector 2226.

The current sensing path 2204 may include: a first shield 2240; a second shield 2242; coils 2244, 2246, which may refer to any of the coils 210, 212, 410, 412, 650, 652, and 2007 of FIGS. 2-7 and 20; a compensation network 2248; a transformer T1; a gain stage 2252; an output matching and protection network 2254; and a coaxial connector 2256. The first shield 2240 is connected to the RF return reference terminal 2230. The second shield 2242 is connected to the ground reference terminal 2232. The shields 2240, 2242 may be embedded in dielectric material of a PCB and separated from each other and other conductive layers by dielectric material.

The compensation network 2248 provides a voltage across a primary coil 2260 of the transformer T1 representative of an amount of current detected by the coils 2244, 2246. The secondary coil 2262 of the transformer T1 is connected to the gain stage 2252, which amplifies the output of the transformer T1. The connection terminals 2264, 2266, 2268 of the coils 2244, 2246 may be connected through the compensation network 2248 to the input terminals of the transformer T1. The center terminal 2266 between the coils 2244, 2246 is connected to the center tap 2270 of the primary coil 2260, such that capacitive coupling present at the other two terminals 2264, 2268 of the primary coil 2260 cancel with the center terminal 2266 to minimize cross-talk. The output of the gain stage 2252 is provided to the output matching and protection network 2254, which provides impedance matching between the gain stage 2252 and the coaxial connector 2256.

Figure 23:
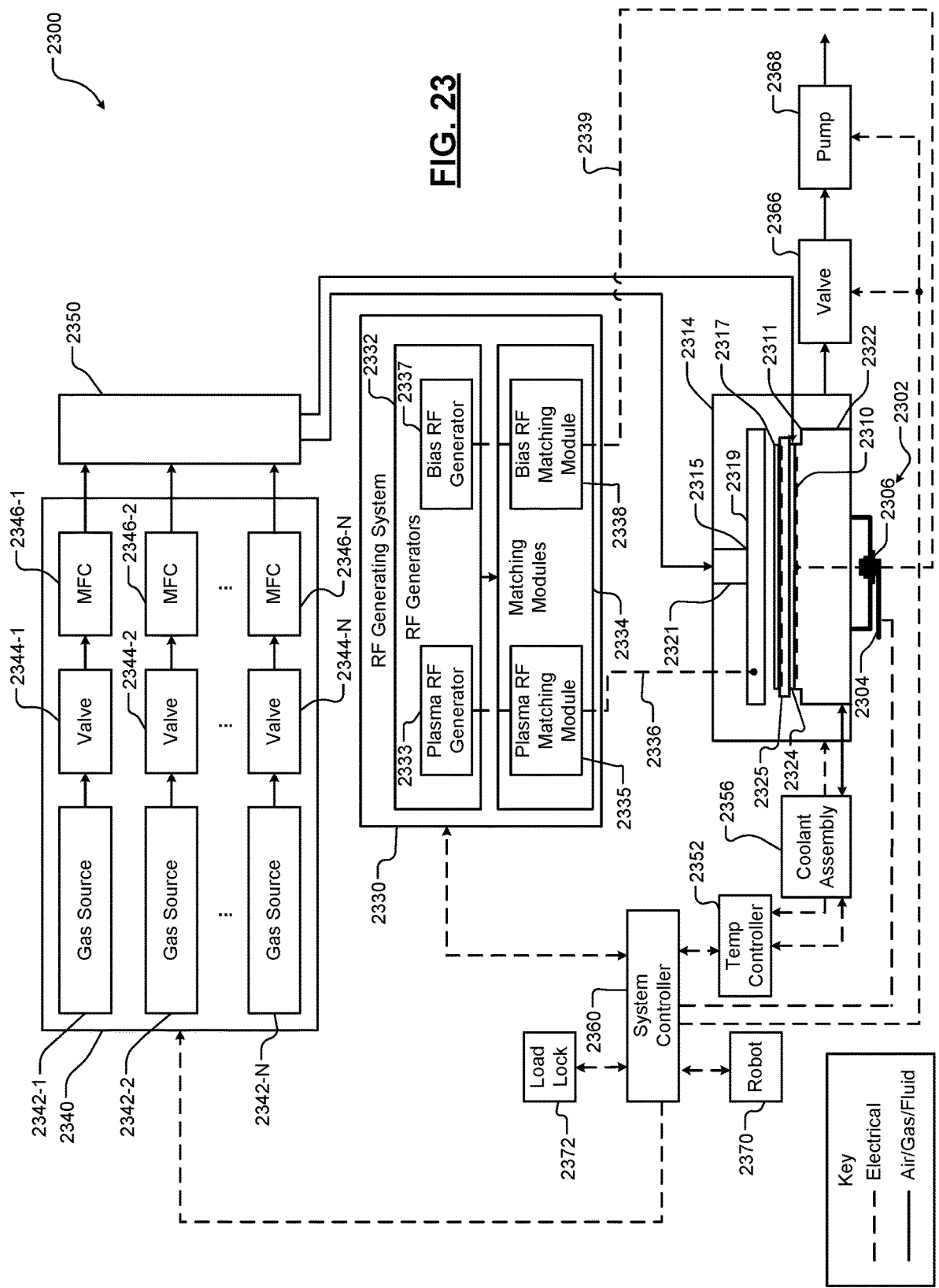
FIG. 23 is an example substrate processing system including a VI probe assembly in accordance with an embodiment of the present disclosure.
Figure 24:
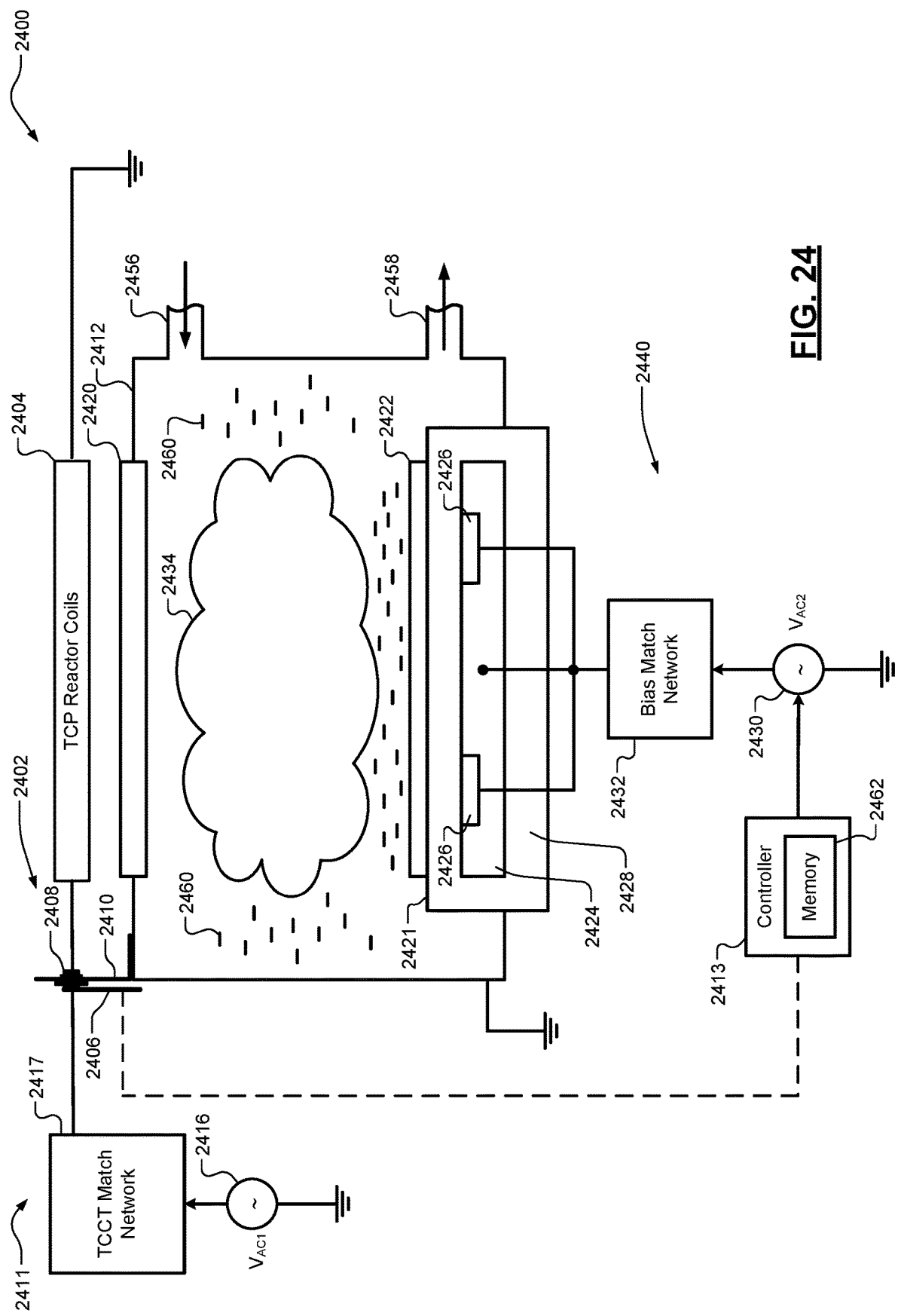
FIG. 24 is an example of another substrate processing system including a VI probe assembly in accordance with an embodiment of the present disclosure.

The control module 2228 may control operations of a substrate processing system based on voltages out of the output matching and protection networks 2224, 2254. Examples of substrate processing systems are shown in FIGS. 23-24. The VI probe assemblies disclosed herein are applicable to other substrate processing systems and other systems where RF voltages and current levels are detected. As another example, the VI probe assemblies are applicable to detecting RF voltages and current levels associated with a hellion source. Although the examples of FIGS. 23-24 include VI probe assemblies implemented in a couple of locations, the VI probe assemblies disclosed herein may be implemented in other locations of substrate processing systems. This may include adjusting various parameters, such as voltages supplied to RF bias electrodes, voltages supplied to transformer coupled plasma (TCP) reactor coils connected to a transformer coupled capacitive tuning (TCCT) match network, and/or other processing system parameters.

FIG. 23 shows a substrate processing system 2300 including a VI probe assembly 2302. In the example shown, the VI probe assembly 2302 is connected to detect a voltage and current supplied via a current carrying conductor to an electrode 2310 in an electrostatic chuck (ESC) 2311. The VI probe assembly 2302 may include a PCB 2304 and a stepped insulator 2306. The VI probe assembly 2302 may be configured as any of the VI probe assemblies disclosed herein. Although FIG. 23 shows a capacitive coupled plasma (CCP) system, the present application is also applicable to other types of processing systems and plasma processing systems. The ESC 2311 electrostatically clamps substrates to the ESC 2311 for processing.

The substrate processing system 2300 further includes a processing chamber 2314. The ESC 2311 is enclosed within the processing chamber 2314. The processing chamber 2314 also encloses other components, such as an upper electrode 2315, and contains RF plasma. During operation, a substrate 2317 (e.g., a semiconductor wafer) is arranged on and electrostatically clamped to the ESC 2311.

A showerhead 2319 that introduces and distributes gases may include or serve as the upper electrode 2315. The showerhead 2319 may include a stem portion 2321 including one end connected to a top surface of the processing chamber 2314. The showerhead 2319 is generally cylindrical and extends radially outward from an opposite end of the stem portion 2321 at a location that is spaced from the top surface of the processing chamber 2314. A substrate-facing surface of the showerhead 2319 includes holes through which gas flows for processing. Alternately, the upper electrode 2315 may include a conducting plate and the gases may be introduced in another manner.

A baseplate 2322 includes the lower (bias) electrode 2310. One or both of the ESC 2311 and the baseplate 2322 may include temperature control elements (TCEs). An intermediate layer 2324 may be arranged between a top plate 2325 of the ESC 2311 and the baseplate 2322. The intermediate layer 2324 may bond or otherwise adhere the ESC 2311 to the baseplate 2322. As an example, the intermediate layer 2324 may be formed of an adhesive material suitable for bonding the ESC 2311 to the baseplate 2322. The baseplate 2322 may include one or more gas channels and/or one or more coolant channels. The gas channels may flow backside gas to a backside of the substrate 2317. The coolant channels flow coolant through the baseplate 2322.

An RF generating system 2330 generates and outputs RF voltages to the upper electrode 2315 and the lower electrode 2310. One of the upper electrode 2315 and the lower electrode 2310 may be DC grounded, AC grounded, or at a floating potential. For example only, the RF generating system 2330 may include one or more RF generators 2332 that generate RF voltages. The output of the RF generator(s) 2332 are fed by one or more matching modules 2334 to the upper electrode 2315 and/or the lower electrode 2310. The matching modules 2334 are configured to match their impedances to the impedances of the upper and lower electrodes 2315 and 2310, such as to minimize reflection.

As an example, a plasma RF generator 2333 generates power to be applied to the upper electrode 2315. A plasma RF matching module 2335 impedance matches the power from the plasma RF generator 2333 to the impedance of the upper electrode 2315 and applies the (impedance matched) power to the upper electrode 2315 via a first transmission line 2336. A bias RF generator 2337 generates power to be applied to the lower electrode 2310. A bias RF matching module 2338 impedance matches the power from the bias RF generator 2337 to the impedance of the lower electrode 2310 and applies the (impedance matched) power to the lower electrode 2310 via a second transmission line 2339.

A gas delivery system 2340 includes one or more gas sources 2342-1, 2342-2, . . . , and 2342-N (collectively gas sources 2342), where N is an integer greater than zero. The gas sources 2342 supply one or more precursors and gas mixtures thereof. The gas sources 2342 may also supply etch gas, carrier gas, and/or purge gas. Vaporized precursor may also be used. The gas sources 2342 are connected by valves 2344-1, 2344-2, . . . , and 2344-N (collectively valves 2344) and mass flow controllers 2346-1, 2346-2, . . . , and 2346-N (collectively mass flow controllers 2346) to a manifold 2350. An output of the manifold 2350 is fed to the processing chamber 2314. For example only, the output of the manifold 2350 may be fed to the showerhead 2319.

The substrate processing system 2300 may include a cooling system that includes a temperature controller 2352. Although shown separately from a system controller 2360, the temperature controller 2352 may be implemented as part of the system controller 2360. The baseplate 2322 may include multiple temperature controlled zones (e.g., 4 zones), where each of the temperature controlled zones includes one or more temperature sensors and one or more temperature control elements (TCEs). The temperature controller 2352 may control operation of the TCEs of a zone based on the temperature(s) measured by the temperature sensor(s) of that zone. The system controller 2360 may be connected to the VI probe assembly 2302 in a similar manner as the system controller 2228 of FIG. 22. The system controller 2360 may control operation of the substrate processing system 2300 including the RF generating system 2330 based on outputs of the PCB 2304.

The temperature controller 2352 may also control a flow rate of backside gas to the gas channels from one or more of the gas sources 2342. The temperature controller 2352 may also control a temperature and a flowrate of coolant flowing through the coolant channels via a coolant assembly 2356. The coolant assembly 2356 may include a coolant pump that pumps coolant from a reservoir to the coolant channels. The coolant assembly 2356 may also include a heat exchanger that transfers heat away from the coolant, such as to air. The coolant may be, for example, a liquid coolant.

A valve 2366 and pump 2368 may be used to evacuate reactants from the processing chamber 2314. A robot 2370 may deliver substrates onto and remove substrates from the ESC 2311. For example, the robot 2370 may transfer substrates between the ESC 2311 and a load lock 2372. The system controller 2360 may control operation of the robot 2370. The system controller 2360 may also control operation of the load lock 2372.

FIG. 24 is an example of another substrate processing system 2400 including a VI probe assembly 2402. In the example shown, the VI probe assembly 2402 is connected to detect a voltage and current supplied via a current carrying conductor to TCP reactor coils 2404. The VI probe assembly 2402 may include a PCB 2406 and a stepped insulator 2408. The stepped insulator 2408 may be connected to a chassis 2410. The VI probe assembly 2402 may be configured as any of the VI probe assemblies disclosed herein.

The substrate processing system 2400 includes a plasma processing chamber 2412, a controller 2413 and the TCP reactor coils 2404. The TCP reactor coils 2404 are disposed outside and above the plasma processing chamber 2412. A first RF power source 2416 provides a first RF source signal. A TCCT (or first) match network 2417 is included between the first RF power source 2416 and the TCP reactor coils 2414. The TCCT match network 2417 enables tuning of power provided to the TCP reactor coils 2404.

The plasma processing chamber 2412 includes a ceramic window 2420, which is located adjacent the TCP reactor coils 2404 and allows efficient transmission of the first RF source signal into the plasma processing chamber 2412 for plasma generation purposes. A substrate support 2421 such as an electrostatic chuck, a pedestal or other suitable substrate support is disposed at the bottom of the plasma processing chamber 2412. The substrate support 2421 supports a substrate 2422. If the substrate support 2421 is an electrostatic chuck, the substrate support 2421 includes electrically conductive portions 2424 and 2426, which are electrically isolated from each other. The substrate support 2421 is surrounded by an insulator 2428 and is capacitively coupled to the substrate 2422. By applying a DC voltage across the conductive portions 2424, 2426, an electrostatic coupling is created between the conductive portions 2424, 2426 and the substrate 2422. This electrostatic coupling attracts the substrate 2422 against the substrate support 2421.

The plasma processing system 2400 further includes a bias RF power source 2430, which is connected to a bias (or second) match network 2432. The second match network 2432 is connected between the bias RF power source 2430 and the substrate support 2421. The second match network 2432 matches an impedance (e.g., 500) of the bias RF power source 2430 to an impedance of the substrate support 2421 and plasma 2434 in the plasma processing chamber 2412 as seen by the second matching network 2432. The controller 2413 monitors outputs of the PCB 2406 and control operation of the RF power sources 2416, 2430 based on the outputs. The controller 2413 may be connected to the VI probe assembly 2402 in a similar manner as the system controller 2228 of FIG. 22.

In operation, a gas capable of ionization flows into the plasma processing chamber 2412 through the gas inlet 2456 and exits the plasma processing chamber 2412 through the gas outlet 2458. The first RF signal is generated by the RF power source 2416 and is delivered to the TCP reactor coil 2414. The first RF signal radiates from the TCP reactor coil 2404 through the window 2420 and into the plasma processing chamber 2412. This causes the gas within the plasma processing chamber 2412 to ionize and form the plasma 2434. The plasma 2434 produces a sheath 2460 along walls of the plasma processing chamber 2412. The plasma 2434 includes electrons and positively charged ions. The electrons, being much lighter than the positively charged ions, tend to migrate more readily, generating DC bias voltages and DC sheath potentials at inner surfaces of the plasma processing chamber 2412. An average DC bias voltage and a DC sheath potential at the substrate 2422 affects the energy with which the positively charged ions strike the substrate 2422. This energy affects processing characteristics such as rates at which etching or deposition occurs.

The controller 2413 may adjust the bias RF signal generated by the RF power source 2430 to change the amount of DC bias and/or a DC sheath potential at the substrate 2422. The controller 2413 may compare outputs of the PCB 2406 and/or representative values derived based on the outputs to one or more set point values. The set point values may be predetermined and stored in a memory 2462 of the controller 2413. The bias RF signal may be adjusted based on differences between (i) the outputs of the PCB 2406 and/or the representative values and (ii) the one more set point values. The bias RF signal passes through the bias match network 2432. An output provided by the bias match network 2432 (referred to as a matched signal) is then passed to the substrate support 2421. The bias RF signal is passed to the substrate 2422 through the insulator 2428.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), field-programmable gate arrays (FPGAs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A probe assembly comprising:
   an insulator configured to surround a current carrying conductor; and
   a first printed circuit board comprising a main portion and an outward protruding portion,
   wherein
      the outward protruding portion is implemented as a voltage probe and extends outward away from the main portion and into the insulator,
      the first printed circuit board further comprises a conductive element, one or more dielectric layers, and a pickup element, wherein the conductive element extends through the one or more dielectric layers and is connected to the pickup element, and wherein the pickup element is embedded in the one or more dielectric layers and disposed proximate the current carrying conductor, and
      the first printed circuit board further includes signal conditioning components connected to the conductive element.

2. The probe assembly of claim 1, wherein the insulator is a stepped insulator.

3. The probe assembly of claim 1, wherein the first printed circuit board is connected to the insulator via at least one of a plate and a bracket.

4. The probe assembly of claim 1, wherein the outward protruding portion is not in contact with the current carrying conductor and is separated from the current carrying conductor by dielectric material of the insulator.

5. The probe assembly of claim 1, wherein the outward protruding portion extends into the insulator and contacts the current carrying conductor.

6. The probe assembly of claim 5, wherein an end of the outward protruding portion that contacts the current carrying conductor is formed of dielectric material.

7. The probe assembly of claim 5, wherein the outward protruding portion comprises a conductive end cap that contacts the current carrying conductor.

8. The probe assembly of claim 1, wherein the outward protruding portion includes an embedded shield.

9. The probe assembly of claim 8, wherein the embedded shield comprises a first conductive layer and a second conductive layer connected to the first conductive layer by a plurality of conductive vias.

10. The probe assembly of claim 1, wherein the conductive element is connected to the pickup element by a via.

11. The probe assembly of claim 1, wherein the outward protruding portion has an end that is shaped to match a shape of the current carrying conductor.

12. The probe assembly of claim 1, wherein the pickup element is shaped to match a shape of the current carrying conductor.

13. The probe assembly of claim 1, wherein the pickup element comprises a plurality of vias connected by conductive elements.

14. The probe assembly of claim 1, wherein:
   the pickup element comprises an end portion and an inner portion separated by dielectric material of the first printed circuit board;
   the end portion includes a first conductive element;
   the inner portion includes a via and a plurality of conductive elements;
   the end portion is configured to contact the current carrying conductor; and
   the inner portion, the end portion and the dielectric material between the inner portion and the end portion provide a primary divider capacitor.

15. The probe assembly of claim 14, wherein the end portion is shaped to match a shape of the current carrying conductor.

16. The probe assembly of claim 1, further comprising a compliant radio frequency conductive element disposed between and in contact with the outward protruding portion and the current carrying conductor.

17. The probe assembly of claim 16, wherein the compliant radio frequency conductive element is implemented as a spring.

18. The probe assembly of claim 16, wherein:
   the current carrying conductor includes a circular-shaped slot that extends circumferentially around the current carrying conductor; and
   the compliant radio frequency conductive element is implemented as a spring and is disposed in the circular-shaped slot.

19. The probe assembly of claim 1, further comprising a current probe comprising a plurality of coils, wherein:
   the plurality of coils are
      mounted on a first side of the first printed circuit board separate from the insulator,
      configured to detect a magnetic field generated by the current carrying conductor, and
      differentially transformer coupled to reject common mode voltage; and
   the voltage probe is disposed on a second side of the first printed circuit board opposite the first side.

20. The probe assembly of claim 19, wherein the first printed circuit board comprises a first plurality of shields disposed between the current carrying conductor and the plurality of coils.

21. The probe assembly of claim 20, wherein the first plurality of shields comprises:

a first shield connected to a radio frequency return reference terminal; and
a second shield connected to a ground reference terminal.

22. The probe assembly of claim 20, wherein the first plurality of shields comprise:
a first shield embedded in the first printed circuit board; and
a second shield disposed on the first printed circuit board.

23. The probe assembly of claim 19, further comprising:
a first plurality of shields at least one of disposed on and embedded in the first printed circuit board;
a second printed circuit board connected to the first printed circuit board and extending perpendicular to the first printed circuit board; and
a second plurality of shields at least one of disposed on and embedded in the second printed circuit board.

24. A substrate processing system comprising:
the probe assembly of claim 1;
the current carrying conductor extending through a hole in the insulator; and
a controller configured to
receive an output of the signal conditioning components, wherein the output is indicative of a voltage on the current carrying conductor, and
adjust an operation of the substrate processing system based on the voltage.

25. A voltage and current probe assembly comprising:
a insulator configured to surround a current carrying conductor;
a voltage probe configured to be disposed at least partially within the insulator, wherein the voltage probe comprises a conductive element, an outer dielectric member, and a pickup element, wherein the conductive element extends through the outer dielectric member and connects to the pickup element, and wherein the pickup element is disposed proximate the current carrying conductor and is separated from the current carrying conductor by dielectric material of the insulator;
a current probe comprising a plurality of coils disposed separate from the insulator and configured to detect a magnetic field generated by the current carrying conductor; and
at least one printed circuit board adjacent to the insulator, wherein
the at least one printed circuit board includes signal conditioning components connected to the conductive element of the voltage probe and the plurality of coils,
the plurality of coils are mounted on a first side of the at least one printed circuit board, and
the voltage probe is disposed on a second side of the at least one printed circuit board opposite the first side.

26. The voltage and current probe assembly of claim 25, wherein the insulator is a stepped insulator.

27. The voltage and current probe assembly of claim 25, wherein the at least one printed circuit board comprises a first plurality of shields disposed between the current carrying conductor and the plurality of coils.

28. The voltage and current probe assembly of claim 27, wherein the first plurality of shields comprises:
a first shield connected to a radio frequency return reference terminal; and
a second shield connected to a ground reference terminal.

29. The voltage and current probe assembly of claim 27, wherein the first plurality of shields comprise:
a first shield embedded in the at least one printed circuit board; and
a second shield disposed on the at least one printed circuit board.

30. The voltage and current probe assembly of claim 25, further comprising:
a first plurality of shields at least one of disposed on and embedded in a first printed circuit board, wherein the at least one printed circuit board comprises the first printed circuit board and a second printed circuit board, and wherein the second printed circuit board is connected to the first printed circuit board and extends perpendicular to the first printed circuit board; and
a second plurality of shields at least one of disposed on and embedded in the second printed circuit board.

31. The voltage and current probe assembly of claim 25, wherein the insulator comprises:
a mounting block comprising a plurality of holes for attaching the insulator to at least one of a plate and a bracket, wherein the at least one of the plate and the bracket is connected to the at least one printed circuit board; and
a plurality of annular members connected to the mounting block.

32. The voltage and current probe assembly of claim 31, wherein:
the mounting block and the plurality of annular members are integrally formed as a single component;
the mounting block and the plurality of annular members are formed of dielectric material; and
the current carrying conductor extends through the mounting block and the plurality of annular members.

33. A substrate processing system comprising:
the voltage and current probe assembly of claim 25;
the current carrying conductor extending through a hole in the insulator; and
a controller configured to
receive outputs of the signal conditioning components, wherein the outputs are indicative of a voltage on and a current level of the current carrying conductor, and
adjust an operation of the substrate processing system based on the voltage and the current level.

34. The substrate processing system of claim 33, further comprising a radio frequency gasket, a mounting plate, and a chassis, wherein:
the at least one printed circuit board is connected to the mounting plate; and
the radio frequency gasket is disposed between the mounting plate and the chassis.

* * * * *